US012398908B2

(12) United States Patent
Douglas et al.

(10) Patent No.: US 12,398,908 B2
(45) Date of Patent: Aug. 26, 2025

(54) BUILDING DATA PLATFORM WITH AIR QUALITY ANALYSIS BASED ON MOBILE AIR QUALITY SENSORS

(71) Applicant: Tyco Fire & Security GmbH, Neuhausen am Rheinfall (CH)

(72) Inventors: Jonathan D. Douglas, Mequon, WI (US); Kirk H. Drees, Cedarburg, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 414 days.

(21) Appl. No.: 17/895,479

(22) Filed: Aug. 25, 2022

(65) Prior Publication Data

US 2023/0070313 A1 Mar. 9, 2023

Related U.S. Application Data

(60) Provisional application No. 63/237,043, filed on Aug. 25, 2021.

(51) Int. Cl.
*F24F 11/65* (2018.01)
*F24F 110/50* (2018.01)
(Continued)

(52) U.S. Cl.
CPC ........... *F24F 11/65* (2018.01); *F24F 2110/50* (2018.01); *F24F 2110/64* (2018.01);
(Continued)

(58) Field of Classification Search
CPC ...................................................... F24F 11/65
See application file for complete search history.

(56) References Cited

U.S. PATENT DOCUMENTS 7,114,555 B2   10/2006   Patel et al.
8,737,630 B2    5/2014   Chang et al.
(Continued)

FOREIGN PATENT DOCUMENTS

EP   1 640 670 A2   3/2006
EP   3 581 854 A1  12/2019
(Continued)

OTHER PUBLICATIONS

U.S. Appl. No. 17/354,338, filed Jun. 22, 2021, Johnson Controls Tyco IP Holdings LLP.
(Continued)

*Primary Examiner* — Gary Collins
(74) *Attorney, Agent, or Firm* — Foley & Lardner LLP

(57) ABSTRACT

A building system operates to receive air quality measurements of a plurality of spaces of the building from a mobile air quality sensor, the mobile air quality sensor configured to collect the air quality measurements of the plurality of spaces while the mobile air quality sensor moves throughout the plurality of spaces of the building and provide the collected air quality measurements to the one or more processors. The air quality measurements include data identifying locations and times at which the air quality measurements were collected The building system operates to cause the one or more processors to store information, or a link to the information, in a database based on the collected air quality measurements, the database including a contextual representation of the plurality of spaces of the building and perform at least one operation using the information based on the air quality measurements.

20 Claims, 9 Drawing Sheets

(51) Int. Cl.

| | | |
|---|---|---|
| *F24F 110/64* | (2018.01) | |
| *F24F 110/66* | (2018.01) | |
| *F24F 110/70* | (2018.01) | |
| *F24F 110/72* | (2018.01) | |

(52) U.S. Cl.
CPC ....... *F24F 2110/66* (2018.01); *F24F 2110/70* (2018.01); *F24F 2110/72* (2018.01)

(56) References Cited

U.S. PATENT DOCUMENTS

| | | | |
|---|---|---|---|
| 10,258,509 | B2 | 4/2019 | Parkins |
| 10,409,226 | B2 | 9/2019 | Balti et al. |
| 11,513,486 | B2 | 11/2022 | Kupa et al. |
| 11,634,214 | B1 | 4/2023 | Parchment et al. |
| 12,094,052 | B1 | 9/2024 | Famighetti et al. |
| 12,178,383 | B2 | 12/2024 | Nakayama et al. |
| 2003/0221821 | A1 | 12/2003 | Patel et al. |
| 2004/0180826 | A1 | 9/2004 | Degli-Esposti Rankin et al. |
| 2006/0064204 | A1 | 3/2006 | Kim et al. |
| 2006/0180676 | A1 | 8/2006 | Park et al. |
| 2011/0127341 | A1 | 6/2011 | Kaneoya et al. |
| 2011/0210178 | A1 | 9/2011 | Murai et al. |
| 2012/0086389 | A1 | 4/2012 | Li |
| 2013/0290234 | A1 | 10/2013 | Harris et al. |
| 2014/0207281 | A1 | 7/2014 | Angle et al. |
| 2014/0277624 | A1 | 9/2014 | Pariseau et al. |
| 2017/0035262 | A1 | 2/2017 | Li et al. |
| 2017/0323550 | A1* | 11/2017 | Patil .................. G08B 5/22 |
| 2017/0357490 | A1 | 12/2017 | Park et al. |
| 2018/0173184 | A1* | 6/2018 | Kienzle .............. G05B 19/042 |
| 2019/0011413 | A1 | 1/2019 | Caussy et al. |
| 2020/0016524 | A1 | 1/2020 | Kim |
| 2020/0041156 | A1 | 2/2020 | Chae et al. |
| 2020/0074832 | A1 | 3/2020 | Vincent et al. |
| 2020/0170468 | A1 | 6/2020 | Nakayama et al. |
| 2020/0224915 | A1 | 7/2020 | Nourbakhsh et al. |
| 2021/0033586 | A1* | 2/2021 | Chadha .............. G01N 33/0065 |
| 2021/0097842 | A1 | 4/2021 | Paton et al. |
| 2021/0193309 | A1 | 6/2021 | Boisvert et al. |
| 2021/0313075 | A1 | 10/2021 | McNamara et al. |
| 2021/0372650 | A1 | 12/2021 | Hyde |
| 2021/0390807 | A1 | 12/2021 | Chaurasia et al. |
| 2021/0390812 | A1 | 12/2021 | Chaurasia et al. |
| 2021/0391089 | A1 | 12/2021 | Eswara et al. |
| 2021/0398659 | A1 | 12/2021 | Sharma et al. |
| 2021/0398690 | A1 | 12/2021 | Gibson et al. |
| 2021/0398691 | A1 | 12/2021 | Dhamija et al. |
| 2022/0026920 | A1 | 1/2022 | Ebrahimi Afrouzi et al. |
| 2022/0060856 | A1 | 2/2022 | Wellig et al. |
| 2022/0066456 | A1 | 3/2022 | Ebrahimi Afrouzi et al. |
| 2022/0192454 | A1 | 6/2022 | Viengkham et al. |
| 2022/0203287 | A1 | 6/2022 | Wenger et al. |
| 2022/0203288 | A1 | 6/2022 | Wenger et al. |
| 2022/0205962 | A1 | 6/2022 | Vanderkoy |
| 2022/0207215 | A1 | 6/2022 | Liu et al. |
| 2022/0221184 | A1 | 7/2022 | Gupta et al. |
| 2022/0228756 | A1 | 7/2022 | Gupta et al. |
| 2022/0254483 | A1 | 8/2022 | Boisvert et al. |
| 2022/0277851 | A1 | 9/2022 | Wellig |
| 2022/0282886 | A1 | 9/2022 | Hriljac et al. |
| 2022/0293261 | A1 | 9/2022 | McBrady et al. |
| 2022/0305438 | A1 | 9/2022 | Wenger et al. |
| 2022/0305881 | A1 | 9/2022 | Neu et al. |
| 2024/0310851 | A1 | 9/2024 | Ebrahimi Afrouzi et al. |

FOREIGN PATENT DOCUMENTS

| | | |
|---|---|---|
| JP | 2004-020132 A | 1/2004 |
| KR | 20180031872 A | 3/2018 |
| WO | WO-2011/145312 A1 | 11/2011 |
| WO | WO-2019/150457 A1 | 8/2019 |
| WO | WO-2020/218652 A1 | 10/2020 |
| WO | WO-2021/258116 A1 | 12/2021 |

OTHER PUBLICATIONS

U.S. Appl. No. 17/708,661, filed Mar. 30, 2022, Johnson Controls Tyco IP Holdings LLP.

International Search Report and Written Opinion on PCT Appl. No. PCT/US2021/062444 dated Mar. 31, 2022 (16 pages).

Plume Labs, "Flow 2: Take a breath, feel the Flow," URL: https://plumelabs.com/en/flow/, retrieved from internet Aug. 19. 2022 (11 pages).

Plume Labs, "Flow Fleets: deploy air quality sensors at scale," URL: https://plumelabs.com/en/sensor-fleets/, retrieved from internet Aug. 19, 2022, (9 pages).

Plume Labs, "Forecast API: the AI-powered platform for air quality data," URL: https://plumelabs.com/en/forecast-api/, retrieved from internet Aug. 19, 2022 (12 pages).

Plume Labs, "Let's do something about air pollution," URL: https://plumelabs.com/en/, retrieved from internet Aug. 19, 2022 (10 pages).

Plume Labs, "The unique one-stop shop for air quality monitoring," URL: https://plumelabs.com/en/solutions/, retrieved from internet Aug. 19, 2022 (11 pages).

Plume Labs, "What are Moves and Spots and how are they created?" URL: https://plumelabs.zendesk.com/hc/en-us/articles/360008608174-What-are-Moves-and-Spots-and-how-are-they-created-, retrieved from internet Aug. 19, 2022 (4 pages).

Alvarado et al., "A Methodology to Monitor Airborne PM10 Dust Particles Using a Small Unmanned Aerial Vehicle," Sensors, 2017, vol. 17 (25 pages).

* cited by examiner

BUILDING DATA PLATFORM WITH AIR QUALITY ANALYSIS BASED ON MOBILE AIR QUALITY SENSORS

CROSS-REFERENCE TO RELATED PATENT APPLICATION

This application claims the benefit of, and priority to, U.S. Provisional Patent Application No. 63/237,043 filed Aug. 25, 2021, the entirety of which is incorporated by reference herein.

BACKGROUND

This application relates generally to building systems. This application relates more particularly to sensor systems for buildings. A building can include stationary sensors that measure conditions of the building, for example, temperature. However, a building system that includes stationary sensors may need a stationary sensor in every location of the building to collect data that properly reflects the conditions of a building. Furthermore, the building may not have a storage techniques to relate conditions of the spaces of the building to the actual spaces of the building.

SUMMARY

One implementation of the present disclosure is a building system of a building including one or more memory devices having instructions stored thereon, that, when executed by one or more processors, cause the one or more processors to receive air quality measurements of spaces of the building from a mobile air quality sensor, the mobile air quality sensor configured to collect the air quality measurements of the spaces while the mobile air quality sensor moves throughout the spaces of the building and provide the air quality measurements to the one or more processors. The air quality measurements include data identifying locations and times at which the air quality measurements were collected. The instructions cause the one or more processors to store information, or a link to the information, in a database based on the air quality measurements and perform at least one operation using the information based on the air quality measurements.

In some embodiments, the instructions cause the one or more processors to control operation of a piece of building equipment to control an environmental condition of at least one space of the spaces based on the information of the digital twin.

In some embodiments, the instructions cause the one or more processors to receive locations of the mobile air quality sensor tracking the mobile air quality sensor throughout the spaces of the building, determine, a first set of air quality measurements of the air quality measurements taken by the mobile air quality sensor in a first space of the spaces, based on the locations, determine, a second set of air quality measurements of the air quality measurements taken by the mobile air quality sensor in a second space of the spaces, based on the locations, store, in the digital twin, first information, or a link to the first information, for the first space based on the first set of air quality measurements, and store, in the digital twin, second information, or a link to the second information, for the second space based on the first set of air quality measurements.

In some embodiments, the mobile air quality sensor includes at least one tractive component configured to move the mobile air quality sensor throughout the spaces of the building.

In some embodiments, the mobile air quality sensor can include a strap configured to be worn by an occupant that moves the mobile air quality sensor throughout the spaces of the building.

In some embodiments, the digital twin includes a building graph including nodes representing entities of the building and edges between the nodes representing relationships between entities of the building. In some embodiments, a first node of the nodes represents the mobile air quality sensor. In some embodiments, a second node of the nodes represents an occupant that carries the mobile air quality sensor throughout the spaces of the building. In some embodiments, an edge of the edges between the first node and the second node indicates that the occupant carries the mobile air quality sensor throughout the spaces of the building.

In some embodiments, the digital twin includes a building graph including nodes representing entities of the building and edges between the nodes representing relationships between entities of the building. In some embodiments, a first node of the nodes represents the mobile air quality sensor. In some embodiments, a second node of the nodes represents an occupant that carries the mobile air quality sensor throughout the spaces of the building. In some embodiments, an edge of the edges between the first node and the second node indicates that the occupant carries the mobile air quality sensor throughout the spaces of the building. In some embodiments, the instructions cause the one or more processors to generate a health metric indicating a health level of the occupant based on the air quality measurements, identify a third node of the nodes related to the second node based on a second edge of the edges between the third node and the second node, and store the health metric, or a link to the health metric, in the third node responsive to identifying the third node.

In some embodiments, the instructions cause the one or more processors to generate a metric describing air quality for a space of the spaces based on the air quality measurements, identify a first node of nodes of a building graph of the digital twin linked to a second node of the nodes representing the space based on an edge of edges between the nodes relating the first node to the second node, and store the metric, or a link to the metric, in the first node responsive to an identification of the first node.

In some embodiments, the instructions cause the one or more processors to receive a timeseries of air quality measurements from the mobile air quality sensor and store the timeseries, or a link to the timeseries, in the digital twin, the digital twin including a representation of the mobile air quality sensor and a relationship between the representation of the mobile air quality sensor and the timeseries or the link to the timeseries.

In some embodiments, the instructions cause the one or more processors to receive a first timeseries of measurements of a first air quality condition from the mobile air quality sensor, receive a second timeseries of measurements of a second air quality condition from the mobile air quality sensor, identify a first node of nodes of a building graph of the digital twin representing the mobile air quality sensor, identify a second node of the nodes of the building graph of the digital twin representing the first air quality condition based on a first edge of edges of the building graph relating the first node to the second node, store information based on the first timeseries, or a link to the information, in the second node responsive to an identification of the second node, identify a third node of the nodes of the building graph of the digital twin representing the second air quality condition based on a second edge of the edges of the building graph relating the first node to the third node, and store information based on the second timeseries, or a link to the information, in the third node responsive to an identification of the third node.

In some embodiments, the air quality measurements are measurements of at least one of a particulate level, a level of volatile organic compounds, a carbon monoxide level, a carbon dioxide level, and a nitrogen dioxide level.

Another implementation of the present disclosure is a method. The method includes collecting, by a mobile air quality sensor, air quality measurements of spaces while the mobile air quality sensor moves throughout the spaces of a building. The air quality measurements include data identifying locations and times at which the air quality measurements were collected. The method includes providing, by the air quality sensor, the air quality measurements to one or more processing circuits. The method includes receiving, by the one or more processing circuits, the air quality measurements of spaces of the building from the mobile air quality sensor. The method includes storing, by the one or more processing circuits, information, or a link to the information, in a database based on the air quality measurements. The method includes performing, by the one or more processing circuits, at least one operation using the information based on the air quality measurements.

In some embodiments, the method includes controlling, by the one or more processing circuits, operation of a piece of building equipment to control an environmental condition of at least one space of the spaces based on the information of the digital twin.

In some embodiments, the method includes receiving, by the one or more processing circuits, locations of the mobile air quality sensor tracking the mobile air quality sensor throughout the spaces of the building, determining, by the one or more processing circuits, a first set of air quality measurements of the air quality measurements taken by the mobile air quality sensor in a first space of the spaces, based on the locations, determining, by the one or more processing circuits, a second set of air quality measurements of the air quality measurements taken by the mobile air quality sensor in a second space of the spaces, based on the locations, storing, by the one or more processing circuits, in the digital twin, first information, or a link to the first information, for the first space based on the first set of air quality measurements, and storing, by the one or more processing circuits, in the digital twin, second information, or a link to the second information, for the second space based on the first set of air quality measurements.

In some embodiments, the digital twin including a building graph including nodes representing entities of the building and edges between the nodes representing relationships between entities of the building. In some embodiments, a first node of the nodes represents the mobile air quality sensor. In some embodiments, a second node of the nodes represents an occupant that carries the mobile air quality sensor throughout the spaces of the building. In some embodiments, an edge of the edges between the first node and the second node indicates that the occupant carries the mobile air quality sensor throughout the spaces of the building.

In some embodiments, the digital twin including a building graph including nodes representing entities of the building and edges between the nodes representing relationships between entities of the building. In some embodiments, a first node of the nodes represents the mobile air quality sensor. In some embodiments, a second node of the nodes represents an occupant that carries the mobile air quality sensor throughout the spaces of the building. In some embodiments, an edge of the edges between the first node and the second node indicates that the occupant carries the mobile air quality sensor throughout the spaces of the building. In some embodiments, the method includes generating, by the one or more processing circuits, a health metric indicating a health level of the occupant based on the air quality measurements, identifying, by the one or more processing circuits, a third node of the nodes related to the second node based on a second edge of the edges between the third node and the second node, and storing, by the one or more processing circuits, the health metric, or a link to the health metric, in the third node responsive to identifying the third node.

In some embodiments, the method includes generating, by the one or more processing circuits, a metric describing air quality for a space of the spaces based on the air quality measurements, identifying, by the one or more processing circuits, a first node of nodes of a building graph of the digital twin linked to a second node of the nodes representing the space based on an edge of edges between the nodes relating the first node to the second node, and storing, by the one or more processing circuits, the metric, or a link to the metric, in the first node responsive to an identification of the first node.

In some embodiments, the method includes receiving, by the one or more processing circuits, a timeseries of air quality measurements from the mobile air quality sensor and storing, by the one or more processing circuits, the timeseries, or a link to the timeseries, in the digital twin, the digital twin including a representation of the mobile air quality sensor and a relationship between the representation of the mobile air quality sensor and the timeseries or the link to the timeseries.

In some embodiments, the method includes receiving, by the one or more processing circuits, a first timeseries of measurements of a first air quality condition from the mobile air quality sensor, receiving, by the one or more processing circuits, a second timeseries of measurements of a second air quality condition from the mobile air quality sensor, identifying, by the one or more processing circuits, a first node of nodes of a building graph of the digital twin representing the mobile air quality sensor, identifying, by the one or more processing circuits, a second node of the nodes of the building graph of the digital twin representing the first air quality condition based on a first edge of edges of the building graph relating the first node to the second node, and storing, by the one or more processing circuits, information based on the first timeseries, or a link to the information, in the second node responsive to an identification of the second node. In some embodiments, the method includes identifying, by the one or more processing circuits, a third node of the nodes of the building graph of the digital twin representing the second air quality condition based on a second edge of the edges of the building graph relating the first node to the third node and storing, by the one or more processing circuits, information based on the second timeseries, or a link to the information, in the third node responsive to an identification of the third node.

Another implementation of the present disclosure is a building system of a building including a mobile air quality sensor, the mobile air quality sensor configured to collect air quality measurements of spaces while the mobile air quality sensor moves throughout the spaces of the building and provide the air quality measurements to one or more processing circuits. The air quality measurements include data identifying locations and times at which the air quality measurements were collected. In some embodiments, the one or more processing circuits configured to receive the air quality measurements of the spaces of the building from the mobile air quality sensor. In some embodiments, the one or more processing circuits store information, or a link to the information, in a database based on the air quality measurements and perform at least one operation using the information based on the air quality measurements.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
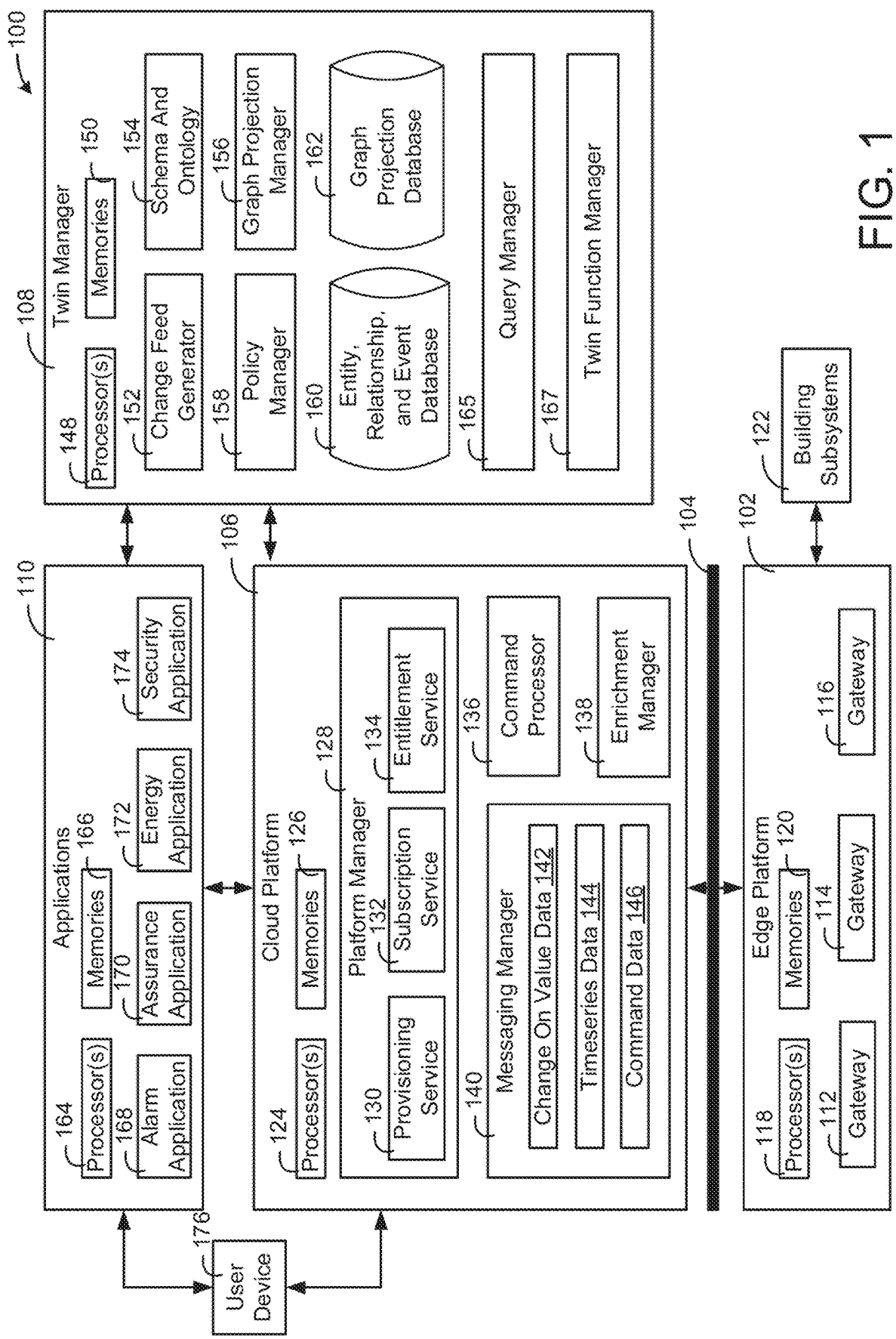
FIG. 1 is a block diagram of a building data platform including an edge platform, a cloud platform, and a twin manager, according to an exemplary embodiment.

Referring generally to the FIGURES, a building data platform with air quality analysis based on mobile air quality sensors is shown, according to various exemplary embodiments. A building or other environment can have a variety of air quality conditions, e.g., volatile organic compound (VOC), carbon dioxide ($CO_2$), total VOC (TVOC), particular matter (PM), etc. that a sensor can measure. However, to effectively identify the air quality throughout the various spaces of the building, the system may need multiple stationary air quality sensors in each area in the building to properly identify the variations in air quality throughout the spaces of the building. The air quality of the spaces of the building may vary substantially across the various areas of the building. Even in a single space of the building (e.g., a long hallway, large conference room, etc.), one stationary sensor may not provide enough spatial resolution. Spatial resolution can be a level of how specific measurements of the sensors are across the building. For example, measurements of ten stationary sensors on a floor of a building may provide a higher spatial resolution of an environmental condition than measurements of three stationary sensors on the floor of the building. Without a high spatial resolution, a source of poor air quality (e.g., wet paint might create high VOC levels) in a particular space such as hallway of a building might not be sensed by a single stationary sensor in the hallway if the stationary sensor is located far enough away from the source of the poor air quality.

If more stationary sensors are installed in a building to improve the spatial resolution, there may be a negative power consumption result. For example, if a large number of stationary sensors are installed throughout the spaces of the building to measure conditions of the spaces with a high spatial resolution, the stationary sensors can collectively consume a high amount of power. Furthermore, as a result of the increased number of stationary sensors, a high level of building network bandwidth can be consumed by the stationary sensors. For example, each stationary sensor may establish a unique network connection with a data collection system and stream or provide measured data to the data collector. This can result in slow network speeds for the stationary sensors or other devices that communicate on the network. Furthermore, technicians may need to service and replace each of the stationary sensors at different times in the life of the stationary sensors. This can utilize significant amounts of maintenance and diagnostic resources.

The building data platform may have difficulty in determining or identifying the location of each stationary sensor and the space or area of the building that each stationary sensor measures. The stationary sensors of the building may not include localization systems, e.g., GPS systems, Wi-Fi triangulation systems, etc. Therefore, a maintenance individual may need to manually inspect the physical location of each stationary sensor and manually enter the location of the stationary sensor into a system. Often, this manual location of each stationary sensor may not be performed and the building data platform may not store any data indicating where sensors are located within spaces of the building. Furthermore, the database that stores the stationary sensor data may not have any mechanism to relate the stationary sensors to the spaces. With no relation of stationary sensors or measurements of the stationary sensors to spaces of the building there may not be any mechanism to relate the locations of people who occupy the building to the conditions that the stationary sensors measure, e.g., to determine what air quality occupants of the building have been exposed to.

To solve these and other technical challenges, the building data platform described herein can include at least one mobile air quality sensor. Furthermore, the building data platform described herein can use a digital twin of a building to store the measurements of the mobile air quality sensors and execute applications or software module based on data of the digital twin. The mobile air quality sensor can move throughout a building, e.g., move throughout the spaces of the building. The mobile air quality sensor can be a robot, drone, autonomous vacuum cleaner, or other system, device, or apparatus, that moves throughout the building. Furthermore, the mobile air quality sensor can be a wearable device that occupants of the building wear or carry throughout the building. Instead of requiring a stationary sensor to be located in every area of the building, the mobile air quality sensor can be moved throughout the building and provide a high spatial resolution by collecting air quality measurements while the air quality sensor moves through the building. By using mobile air quality sensors, the building platform can operate on a high spatial resolution while requiring fewer sensors.

The mobile air quality sensor can measure, collect, store, or stream air quality measurements of one or multiple different air quality parameters as the mobile air quality sensor moves throughout the various spaces of the building. The mobile air quality sensor can communicate, via a network, with the building data platform to provide the measurements to the building data platform. Furthermore, the mobile air quality sensor can provide (or cause another device to provide) a location of the mobile air quality sensor to the building data platform. The building data platform can use the location data to determine the location within the building that every sensor measurement (or at least a portion of the sensor measurements) were taken at. A single mobile air quality sensor can measure conditions of multiple different locations of the building while only using a limited amount of network resources. For example, instead of requiring multiple simultaneous network connections of multiple different stationary sensors, the single mobile air quality sensor can measure conditions in the various locations that the different stationary sensors would be located and only use a single network connection. The amount of network bandwidth used by the single network connection of the mobile air quality sensor can be less than the amount of network bandwidth of the multiple stationary sensors. Furthermore, the mobile air quality sensor can use less power than the group of stationary air quality sensors collectively consumes while measuring environmental conditions in all of the same locations as the group of stationary air quality sensors. Furthermore, instead of requiring maintenance on the group of stationary air quality sensors, the single mobile air quality sensor may be the only sensor requiring periodic maintenance and therefore, less maintenance resources can be consumed.

Based on the received air quality measurements and the location data indicating the locations where the measurements were taken within the building, the building data platform can update a digital twin. The digital twin can be a digital twin of a building, space of a building, person, piece of building equipment, etc. The digital twin can be or include a building graph or graph data structure. The digital twin can be or include a building information model, a virtual reality based digital twin, an augmented reality digital twin, or any other digital twin that provides a contextual description of building, the spaces of the building, people of the building, equipment of the building, events of the building, etc. The digital twin can further include measurements of the mobile air quality sensor, locations that the mobile air quality sensor has been located, occupants that carry or wear the mobile air quality sensors, spaces that the occupants of the building are located within, metrics indicating health of the occupants or spaces based on whether the occupant or space has been exposed to the air quality, etc.

The digital twin can include a building graph that represents entities of the building (e.g., the building, spaces of the building, equipment, people, events). The building graph can include edges between nodes of the building graph that indicate relationships between the various entities of the building. The building graph can indicate the locations of various spaces of the building, measurements of the building, locations that occupants have been, etc. to allow applications, pieces of software, or other applications to generate data such as metrics, aggregations, insights, predictions, or inferences for various spaces or people. By using a building graph, the applications that operate against the graph can perform a single query to identify complex relationships between entities of the building and the data associated with the entities of the building. Furthermore, the applications can execute a single query against the building graph instead of needing to query multiple different data sources, e.g., one database for context of a building, another database for telemetry of the mobile air quality sensor, etc. Furthermore, all of the data generated by the applications can be ingested back into the building graph and related to the entities that the generated data describes. For example, if a metric is generated to represent the health of a person, the building graph can use an edge to link a node representing the person to a node representing the metric.

For example, if an application operates to generate a health metric of a user indicating the effect of air quality data on an occupant, the application can generate a single query (or multiple queries) that requests information describing the spaces that the occupant has been located in and the air quality of the spaces that the mobile air quality sensor has been measured. Because the building graph includes the spatial locations of the mobile air quality sensor and the occupant in addition to the actual environmental conditions of the spaces, a single query (or multiple queries) can retrieve all of the necessary data that the application needs to execute. By reducing the number of queries that need to be processed and data sources that need to be queried, the building data platform can execute applications faster by reducing the number of queries necessary which uses less processing resources and less memory and storage resources.

Referring now to FIG. 1, a building data platform 100 including an edge platform 102, a cloud platform 106, and a twin manager 108 are shown, according to an exemplary embodiment. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within the building. However, any combination of on-premises and off-premises components of the building data platform 100 can be implemented.

The building data platform 100 includes applications 110. The applications 110 can be various applications that operate to manage the building subsystems 122. The applications 110 can be remote or on-premises applications (or a hybrid of both) that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be the gateways described in U.S. Provisional Patent Application No. 62/951,897 filed Dec. 20, 2019, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive timeseries data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID,"

and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "Device-BadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only 1/10 of the events are enriched. By looking at what events are enriched and what events are not enriched, a system can do traffic shaping of forwarding of these events to reduce the cost of forwarding events that no consuming application wants or reads.

An example of an event received by the enrichment manager 138 may be:

```
{
"id": "someguid",
"eventType": "Device_Heartbeat",
"eventTime": "2018-01-27T00:00:00+00:00"
"eventValue": 1,
"deviceID": "someguid"
}
```

An example of an enriched event generated by the enrichment manager 138 may be:

```
{
"id": "someguid",
"eventType": "Device_Heartbeat",
"eventTime": "2018-01-27T00:00:00+00:00"
"eventValue": 1,
"deviceID": "someguid",
"buildingName": "Building-48",
"buildingID": "SomeGuid",
"panelID": "SomeGuid",
"panelName": "Building-48-Panel-13",
"cityID": 371,
"cityName": "Milwaukee",
"stateID": 48,
"stateName": "Wisconsin (WI)",
"countryID": 1,
"countryName": "United States"
}
```

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building. The twin manager 108 can include a change feed generator 152, a schema and ontology 154, a projection manager 156, a policy manager 158, an entity, relationship, and event database 160, and a graph projection database 162.

The graph projection manager 156 can be configured to construct graph projections and store the graph projections in the graph projection database 162. Examples of graph projections are shown in FIGS. 11-13. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., telemetry data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, VAVs, etc. The graph projection database 162 can store graph projections that keep up a current state of a building.

The graph projections of the graph projection database 162 can be digital twins of a building. Digital twins can be digital replicas of physical entities that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can identify a policy for a commanding entity within the graph projection to determine whether the commanding entity has the ability to make the command. For example, the command processor 136, before allowing a user to make a command, determine, based on the graph projection database 162, to determine that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more conditional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 100 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detecting a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates an graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

Region←→Building←→Floor←→Space←→Asset

For the ontology of a subscription of "Customer B," the graph projection manager 156 can create relationships based on the rule:

Building←→Floor←→Asset

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply permissions across a graph, e.g., if "user can view all data associated with floor 1" then they see all subsystem data for that floor, e.g., surveillance cameras, HVAC devices, fire detection and response devices, etc.

The twin manager 108 includes a query manager 165 and a twin function manager 167. The query manger 164 can be configured to handle queries received from a requesting system, e.g., the user device 176, the applications 110, and/or any other system. The query manager 165 can receive queries that include query parameters and context. The query manager 165 can query the graph projection database 162 with the query parameters to retrieve a result. The query manager 165 can then cause an event processor, e.g., a twin function, to operate based on the result and the context. In some embodiments, the query manager 165 can select the twin function based on the context and/or perform operates based on the context. In some embodiments, the query manager 165 is configured to perform the operations described with reference to FIGS. 5-10.

The twin function manager 167 can be configured to manage the execution of twin functions. The twin function manager 167 can receive an indication of a context query that identifies a particular data element and/or pattern in the graph projection database 162. Responsive to the particular data element and/or pattern occurring in the graph projection database 162 (e.g., based on a new data event added to the graph projection database 162 and/or change to nodes or edges of the graph projection database 162, the twin function manager 167 can cause a particular twin function to execute. The twin function can execute based on an event, context, and/or rules. The event can be data that the twin function executes against. The context can be information that provides a contextual description of the data, e.g., what device the event is associated with, what control point should be updated based on the event, etc. The twin function manager 167 can be configured to perform the operations of the FIGS. 11-15.

Figure 2:
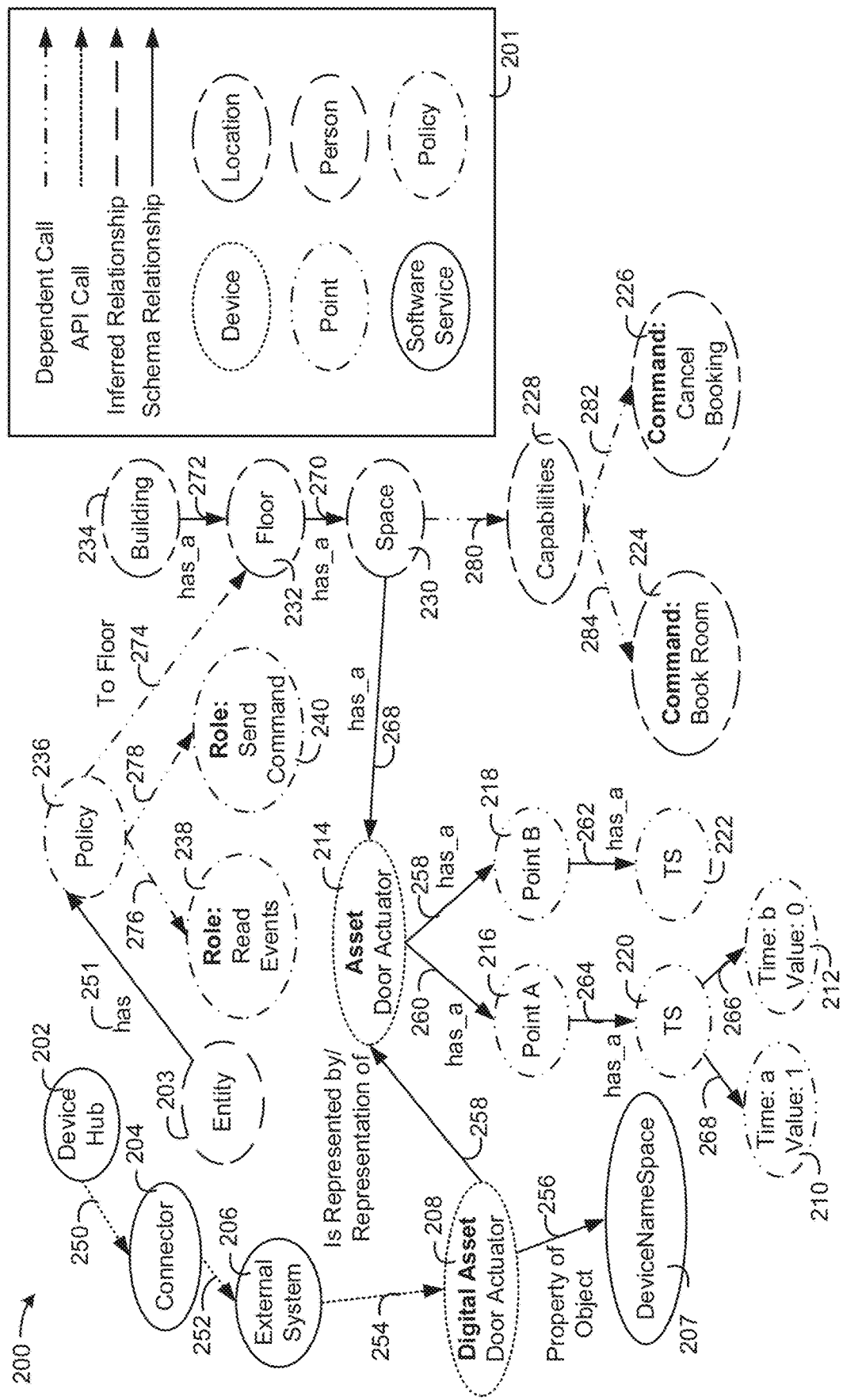
FIG. 2 is a graph projection of the twin manager of FIG. 1 including application programming interface (API) data, capability data, policy data, and services, according to an exemplary embodiment.

Referring now to FIG. 2, a graph projection 200 of the twin manager 108 including application programming interface (API) data, capability data, policy data, and services is shown, according to an exemplary embodiment. The graph projection 200 includes nodes 202-240 and edges 250-272. The nodes 202-240 and the edges 250-272 are defined according to the key 201. The nodes 202-240 represent different types of entities, devices, locations, points, persons, policies, and software services (e.g., API services). The edges 250-272 represent relationships between the nodes 202-240, e.g., dependent calls, API calls, inferred relationships, and schema relationships (e.g., BRICK relationships).

The graph projection 200 includes a device hub 202 which may represent a software service that facilitates the communication of data and commands between the cloud platform 106 and a device of the building subsystems 122, e.g., door actuator 214. The device hub 202 is related to a connector 204, an external system 206, and a digital asset "Door Actuator" 208 by edge 250, edge 252, and edge 254.

The cloud platform 106 can be configured to identify the device hub 202, the connector 204, the external system 206 related to the door actuator 214 by searching the graph projection 200 and identifying the edges 250-254 and edge 258. The graph projection 200 includes a digital representation of the "Door Actuator," node 208. The digital asset "Door Actuator" 208 includes a "DeviceNameSpace" represented by node 207 and related to the digital asset "Door Actuator" 208 by the "Property of Object" edge 256.

The "Door Actuator" 214 has points and timeseries. The "Door Actuator" 214 is related to "Point A" 216 by a "has_a" edge 260. The "Door Actuator" 214 is related to "Point B" 218 by a "has_A" edge 258. Furthermore, timeseries associated with the points A and B are represented by nodes "TS" 220 and "TS" 222. The timeseries are related to the points A and B by "has_a" edge 264 and "has_a" edge 262. The timeseries "TS" 220 has particular samples, sample 210 and 212 each related to "TS" 220 with edges 268 and 266 respectively. Each sample includes a time and a value. Each sample may be an event received from the door actuator that the cloud platform 106 ingests into the entity, relationship, and event database 160, e.g., ingests into the graph projection 200.

The graph projection 200 includes a building 234 representing a physical building. The building includes a floor represented by floor 232 related to the building 234 by the "has_a" edge from the building 234 to the floor 232. The floor has a space indicated by the edge "has_a" 270 between the floor 232 and the space 230. The space has particular capabilities, e.g., is a room that can be booked for a meeting, conference, private study time, etc. Furthermore, the booking can be canceled. The capabilities for the floor 232 are represented by capabilities 228 related to space 230 by edge 280. The capabilities 228 are related to two different commands, command "book room" 224 and command "cancel booking" 226 related to capabilities 228 by edge 284 and edge 282 respectively.

If the cloud platform 106 receives a command to book the space represented by the node, space 230, the cloud platform 106 can search the graph projection 200 for the capabilities for the 228 related to the space 230 to determine whether the cloud platform 106 can book the room.

In some embodiments, the cloud platform 106 could receive a request to book a room in a particular building, e.g., the building 234. The cloud platform 106 could search the graph projection 200 to identify spaces that have the capabilities to be booked, e.g., identify the space 230 based on the capabilities 228 related to the space 230. The cloud platform 106 can reply to the request with an indication of the space and allow the requesting entity to book the space 230.

The graph projection 200 includes a policy 236 for the floor 232. The policy 236 is related set for the floor 232 based on a "To Floor" edge 274 between the policy 236 and the floor 232. The policy 236 is related to different roles for the floor 232, read events 238 via edge 276 and send command 240 via edge 278. The policy 236 is set for the entity 203 based on has edge 251 between the entity 203 and the policy 236.

The twin manager 108 can identify policies for particular entities, e.g., users, software applications, systems, devices, etc. based on the policy 236. For example, if the cloud platform 106 receives a command to book the space 230. The cloud platform 106 can communicate with the twin manager 108 to verify that the entity requesting to book the space 230 has a policy to book the space. The twin manager 108 can identify the entity requesting to book the space as the entity 203 by searching the graph projection 200. Furthermore, the twin manager 108 can further identify the edge has 251 between the entity 203 and the policy 236 and the edge 1178 between the policy 236 and the command 240.

Furthermore, the twin manager 108 can identify that the entity 203 has the ability to command the space 230 based on the edge 1174 between the policy 236 and the edge 270 between the floor 232 and the space 230. In response to identifying the entity 203 has the ability to book the space 230, the twin manager 108 can provide an indication to the cloud platform 106.

Furthermore, if the entity makes a request to read events for the space 230, e.g., the sample 210 and the sample 212, the twin manager 108 can identify the edge has 251 between the entity 203 and the policy 236, the edge 1178 between the policy 236 and the read events 238, the edge 1174 between the policy 236 and the floor 232, the "has_a" edge 270 between the floor 232 and the space 230, the edge 268 between the space 230 and the door actuator 214, the edge 260 between the door actuator 214 and the point A 216, the "has_a" edge 264 between the point A 216 and the TS 220, and the edges 268 and 266 between the TS 220 and the samples 210 and 212 respectively.

Figure 3:
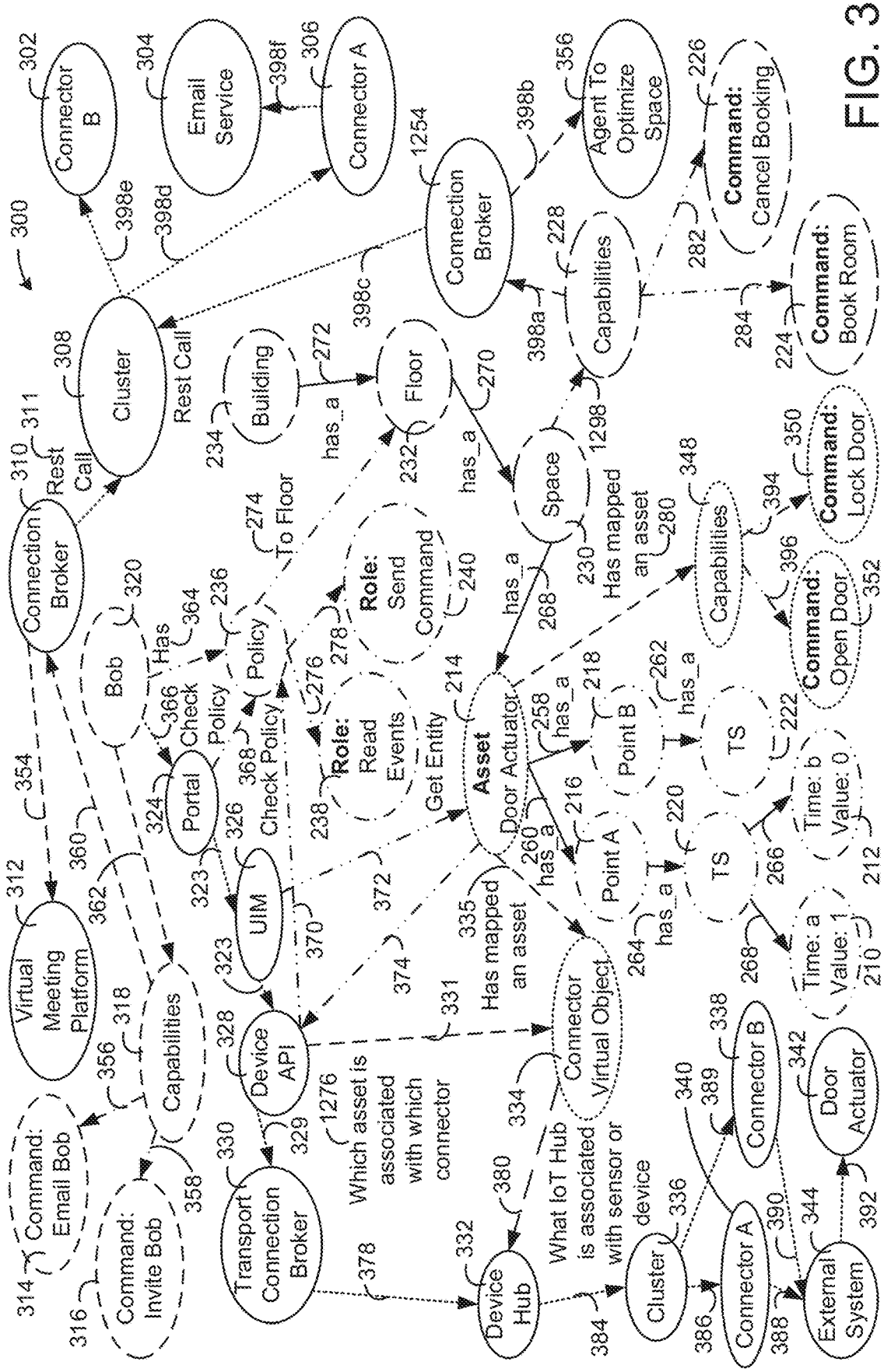
FIG. 3 is another graph projection of the twin manager of FIG. 1 including application programming interface (API) data, capability data, policy data, and services, according to an exemplary embodiment.

Referring now to FIG. 3, a graph projection 300 of the twin manager 108 including application programming interface (API) data, capability data, policy data, and services is shown, according to an exemplary embodiment. The graph projection 300 includes the nodes and edges described in the graph projection 200 of FIG. 2. The graph projection 300 includes a connection broker 1254 related to capabilities 228 by edge 398a. The connection broker 1254 can be a node representing a software application configured to facilitate a connection with another software application. In some embodiments, the cloud platform 106 can identify the system that implements the capabilities 228 by identifying the edge 398a between the capabilities 228 and the connection broker 1254.

The connection broker 1254 is related to an agent that optimizes a space 356 via edge 398b. The agent represented by the node 356 can book and cancel bookings for the space represented by the node 230 based on the edge 398b between the connection broker 1254 and the node 356 and the edge 398a between the capabilities 228 and the connection broker 1254.

The connection broker 1254 is related to a cluster 308 by edge 398c. Cluster 308 is related to connector B 302 via edge 398e and connector A 306 via edge 398d. The connector A 306 is related to an external subscription service 304. A connection broker 310 is related to cluster 308 via an edge 311 representing a rest call that the connection broker represented by node 310 can make to the cluster represented by cluster 308.

The connection broker 310 is related to a virtual meeting platform 312 by an edge 354. The node 312 represents an external system that represents a virtual meeting platform. The connection broker represented by node 310 can represent a software component that facilitates a connection between the cloud platform 106 and the virtual meeting platform represented by node 312. When the cloud platform 106 needs to communicate with the virtual meeting platform represented by the node 312, the cloud platform 106 can identify the edge 354 between the connection broker 310 and the virtual meeting platform 312 and select the connection broker represented by the node 310 to facilitate communication with the virtual meeting platform represented by the node 312.

A capabilities node 318 can be connected to the connection broker 310 via edge 360. The capabilities 318 can be capabilities of the virtual meeting platform represented by the node 312 and can be related to the node 312 through the edge 360 to the connection broker 310 and the edge 354 between the connection broker 310 and the node 312. The capabilities 318 can define capabilities of the virtual meeting platform represented by the node 312. The node 320 is related to capabilities 318 via edge 362. The capabilities may be an invite bob command represented by node 316 and an email bob command represented by node 314. The capabilities 318 can be linked to a node 320 representing a user, Bob. The cloud platform 106 can facilitate email commands to send emails to the user Bob via the email service represented by the node 304. The node 304 is related to the connect a node 306 via edge 398f. Furthermore, the cloud platform 106 can facilitate sending an invite for a virtual meeting via the virtual meeting platform represented by the node 312 linked to the node 318 via the edge 358.

The node 320 for the user Bob can be associated with the policy 236 via the "has" edge 364. Furthermore, the node 320 can have a "check policy" edge 366 with a portal node 324. The device API node 328 has a check policy edge 370 to the policy node 236. The portal node 324 has an edge 368 to the policy node 236. The portal node 324 has an edge 323 to a node 326 representing a user input manager (UIM). The portal node 324 is related to the UIM node 326 via an edge 323. The UIM node 326 has an edge 323 to a device API node 328. The UIM node 326 is related to the door actuator node 214 via edge 372. The door actuator node 214 has an edge 374 to the device API node 328. The door actuator 214 has an edge 335 to the connector virtual object 334. The device hub 332 is related to the connector virtual object via edge 380. The device API node 328 can be an API for the door actuator 214. The connector virtual object 334 is related to the device API node 328 via the edge 331.

The device API node 328 is related to a transport connection broker 330 via an edge 329. The transport connection broker 330 is related to a device hub 332 via an edge 378. The device hub represented by node 332 can be a software component that hands the communication of data and commands for the door actuator 214. The cloud platform 106 can identify where to store data within the graph projection 300 received from the door actuator by identifying the nodes and edges between the points 216 and 218 and the device hub node 332. Similarly, the cloud platform 106 can identify commands for the door actuator that can be facilitated by the device hub represented by the node 332, e.g., by identifying edges between the device hub node 332 and an open door node 352 and an lock door node 350. The door actuator 114 has an edge "has mapped an asset" 280 between the node 214 and a capabilities node 348. The capabilities node 348 and the nodes 352 and 350 are linked by edges 396 and 394.

The device hub 332 is linked to a cluster 336 via an edge 384. The cluster 336 is linked to connector A 340 and connector B 338 by edges 386 and the edge 389. The connector A 340 and the connector B 338 is linked to an external system 344 via edges 388 and 390. The external system 344 is linked to a door actuator 342 via an edge 392.

Figure 4:
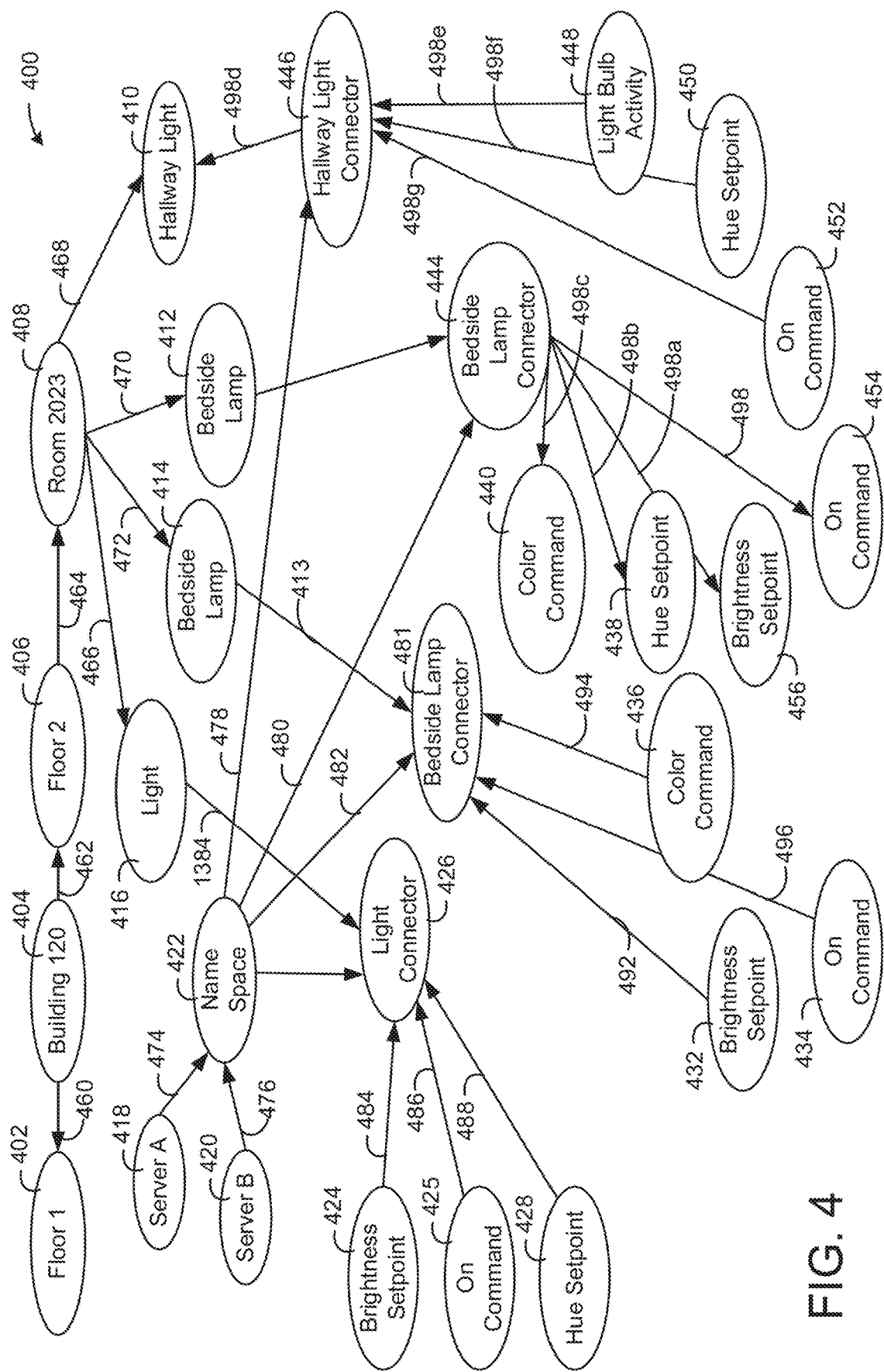
FIG. 4 is a graph projection of the twin manager of FIG. 1 including equipment and capability data for the equipment, according to an exemplary embodiment.

Referring now to FIG. 4, a graph projection 400 of the twin manager 108 including equipment and capability data for the equipment is shown, according to an exemplary embodiment. The graph projection 400 includes nodes 402-456 and edges 360-498f. The cloud platform 106 can search the graph projection 400 to identify capabilities of different pieces of equipment.

A building node 404 represents a particular building that includes two floors. A floor 1 node 402 is linked to the building node 404 via edge 460 while a floor 2 node 406 is linked to the building node 404 via edge 462. The floor 2 includes a particular room 2023 represented by edge 464 between floor 2 node 406 and room 2023 node 408. Various pieces of equipment are included within the room 2023. A light represented by light node 416, a bedside lamp node 414, a bedside lamp node 412, and a hallway light node 410 are related to room 2023 node 408 via edge 466, edge 472, edge 470, and edge 468.

The light represented by light node 416 is related to a light connector 426 via edge 484. The light connector 426 is related to multiple commands for the light represented by the light node 416 via edges 484, 486, and 488. The commands may be a brightness setpoint 424, an on command 425, and a hue setpoint 428. The cloud platform 106 can receive a request to identify commands for the light represented by the light 416 and can identify the nodes 424-428 and provide an indication of the commands represented by the node 424-428 to the requesting entity. The requesting entity can then send commands for the commands represented by the nodes 424-428.

The bedside lamp node 414 is linked to a bedside lamp connector 481 via an edge 413. The connector 481 is related to commands for the bedside lamp represented by the bedside lamp node 414 via edges 492, 496, and 494. The command nodes are a brightness setpoint node 432, an on command node 434, and a color command 436. The hallway light 410 is related to a hallway light connector 446 via an edge 498*d*. The hallway light connector 446 is linked to multiple commands for the hallway light node 410 via edges 498*g*, 498*f*, and 498*e*. The commands are represented by an on command node 452, a hue setpoint node 450, and a light bulb activity node 448.

The graph projection 400 includes a name space node 422 related to a server A node 418 and a server B node 420 via edges 474 and 476. The name space node 422 is related to the bedside lamp connector 481, the bedside lamp connector 444, and the hallway light connector 446 via edges 482, 480, and 478. The bedside lamp connector 444 is related to commands, e.g., the color command node 440, the hue setpoint command 438, a brightness setpoint command 456, and an on command 454 via edges 498*c*, 498*b*, 498*a*, and 498.

Figure 5:
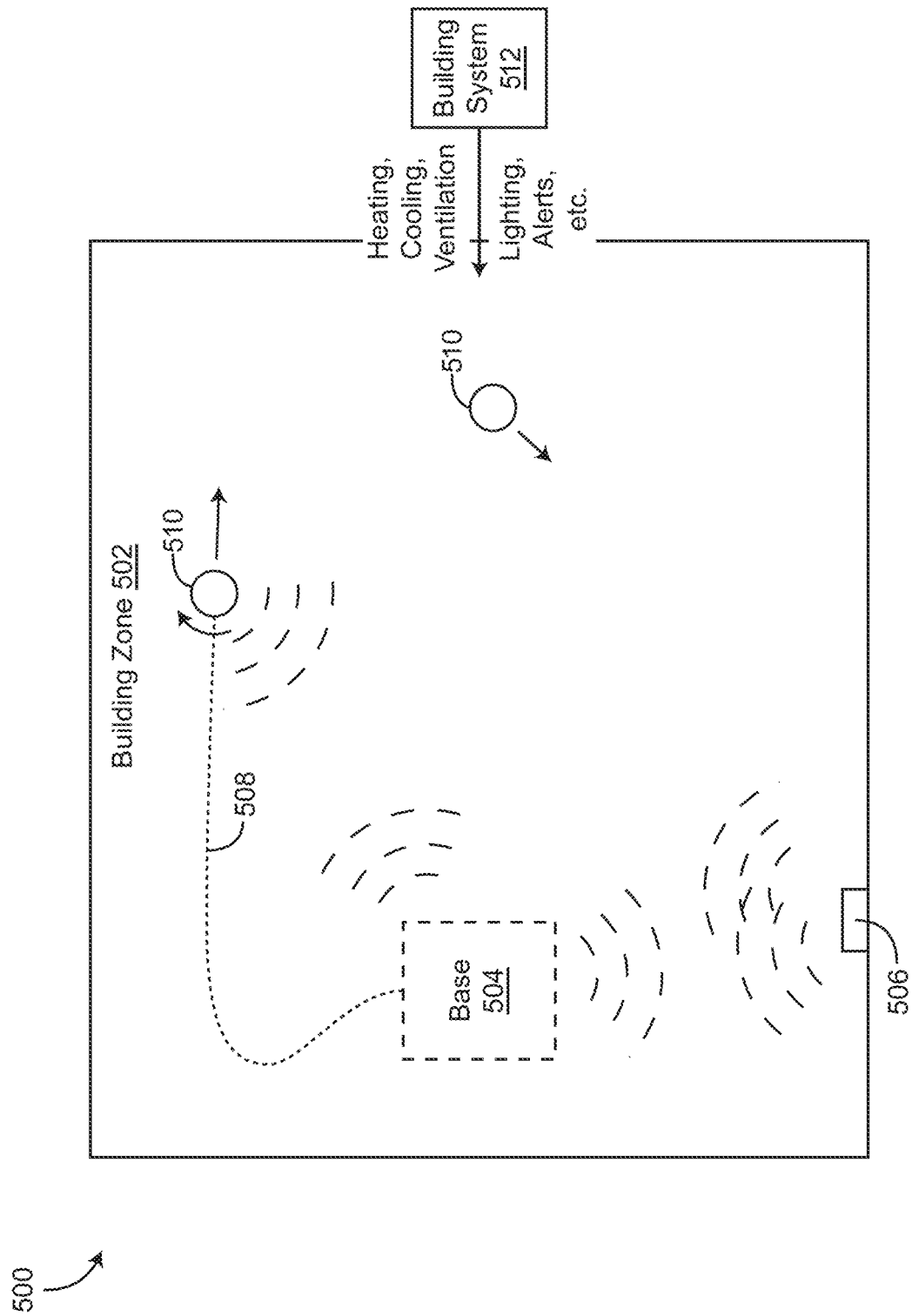
FIG. 5 is a diagram of an indoor air quality (IAQ) control system including one or more autonomous devices that include sensors, according to some embodiments.

Referring particularly to FIG. 5, a system 500 for a building zone 502 is shown, according to some embodiments. The building zone 502 is a room, a space, an area, etc., of a building, a house, a factory, a manufacturing facility, an office space, etc., according to some embodiments. For example, the system 500 may be implemented in a residential setting, a manufacturing setting, an office setting, a school setting, a laboratory setting, a transit setting, etc., according to some embodiments. The building zone 502 is shown as a single space, but may include any number of rooms, zones, sub-rooms, sections of a room, a floor of a building, an aggregation of multiple zones, etc., according to some embodiments.

In some embodiments, the system 500 includes a base 504, a controller 506, and one or more mobile devices, such as autonomous devices 510 (e.g., autonomous robots, mobile air quality sensors, mobile devices, drones, autonomous vacuum cleaners, etc., or any other autonomously movable, translatable, flyable, or repositionable devices that can be configured to move about the building zone 502), that are designed to move around within the building zone 502. It should be understood that, while the one or more autonomous devices 510 are described herein as autonomous vacuum cleaning robots, this is for illustrative purposes, and should not be understood as limiting. For example, the one or more autonomous devices 510 may include a combination of autonomous vacuum cleaning robots, drones, individuals with smartphones having one or more sensors, etc., according to some embodiments. Further, in some implementations, non-autonomous devices may be used instead of or in addition to autonomous devices 510. For example, in some implementations, a mobile device such as a ground or air-based device (e.g., car or other wheeled device, drone, etc.) may be moved around the space manually by a user, either via remote control (e.g., radio frequency, WiFi, Bluetooth, etc.) or by manually moving the device around the space (e.g., walking a wheeled or handheld device around the space). While the disclosure below generally discussed autonomous devices, it should be understood that implementations with non-autonomous devices are contemplated by and fall within the scope of the present disclosure.

In some embodiments, the one or more autonomous devices 510 are configured to move about the building zone 502 (e.g., along a path 508) to perform various operations at different locations about the building zone 502 (e.g., vacuum cleaning operations, sanitization operations, service operations, etc.). The one or more autonomous devices 510 can include a primary mover (e.g., an electric motor) that is configured to drive the autonomous device 510 to move about the building zone 502 (e.g., by driving wheels, driving a tread, driving a tractive component or element, etc.), according to some embodiments. In some embodiments, the one or more autonomous devices 510 can include one or more additional primary movers or electric motors for performing the various operations (e.g., an electric motor configured to drive a vacuum cleaning apparatus, etc.). In some embodiments, the one or more autonomous devices 510 also include an energy storage device (e.g., a battery, a multiple of battery cells, etc.). In some embodiments, the one or more autonomous devices 510 are configured to use energy stored in the energy storage device to power the primary movers for mobility and/or performing different operations throughout the building zone 502.

The base 504 may be or include a zone, a charging station, a controller, a processor, etc., according to some embodiments. In some embodiments, the one or more autonomous devices 510 are configured to return to the base 504 (e.g., for charging). The one or more autonomous devices 510 may capture data (e.g., sensor data, position data, route data, etc.) as the autonomous devices 510 travel along their route, and may provide any of the collected data to the base 504 when the autonomous devices 510 return to the base 504. In some embodiments, the one or more autonomous devices 510 are configured to communicate with the base 504 when the autonomous devices 510 return to the base. In some embodiments, the autonomous devices 510 are configured to communicate wirelessly with the base 504 and/or the controller 506 as the autonomous devices 510 travel about the building zone 502. The autonomous devices 510 can be configured to communicate with the base 504 and/or the controller 506 using a wireless communications protocol (e.g., Bluetooth, LoRa, Zigbee, WiFi, cellular communications, radio transmission, etc.). In some embodiments, the autonomous devices 510 are configured to connect with a wireless network of a building of the building zone 502 and transmit information (e.g., position data, sensor data, operational data, etc.) to the base 504 and/or the controller 506 as the autonomous devices 510 travel about the building zone 502. In this way, information or data from the autonomous devices 510 can be provided to the base 504 and/or the controller 506 in real-time or near real-time. In some embodiments, the autonomous device 510 is configured to log and track information obtained along its route (e.g., position data and corresponding sensor data, operational data, etc.) and provide the logged information to the base 504 when the autonomous devices 510 return to the base 504. In this way, information from the autonomous devices 510 can be obtained intermittently when the autonomous devices 510 return to the base 504 (e.g., for charging).

In some embodiments, the controller 506 and the base 504 are configured to communicate wirelessly using any of the wireless communications protocols described herein. In this way, any information provided to the base 504 by the autonomous devices 510 can also be provided to the controller 506 (e.g., intermittently and/or in real-time as described in greater detail above).

In some embodiments, the system 500 includes a building system 512. The building system 512 may be a heating, ventilation, or air conditioning (HVAC) system. In some embodiments, the controller 506 is configured to operate the building system 512 to provide heating, cooling, and/or ventilation to the building zone 502. In some embodiments, the HVAC system is a variable refrigerant flow (VRF) system, a single stage HVAC system, a multi-stage HVAC system, a variable air volume (VAV) HVAC system, etc., or any other system or combination of systems configured to provide heating, cooling, and/or ventilation to the building zone 502. The HVAC system can include building equipment (e.g., a chiller, a VRF device, a fan, etc.) configured to operate to affect an environmental or variable condition of the building zone 502. The building system 512 may also be or include a lighting system, an alert system, a fire suppression system, a reporting system, an optimization system, etc., according to some embodiments.

In some embodiments, the one or more autonomous devices 510 include an environmental condition sensor, an IAQ sensor, etc., or an array of one or more sensors. The autonomous devices 510 can obtain, collect, measure, detect, etc., different values of different environmental conditions, such as IAQ, particulate matter, smoke presence, a fire condition, etc., as the autonomous devices 510 travel about the building zone 502. In some embodiments, the autonomous devices 510 are configured to provide sensor data and position to the controller 506 and/or the base 504 in real-time, near real-time or in an intermittent basis (e.g., when the autonomous devices 510 return to the base 504).

In some embodiments, the one or more autonomous devices 510 include sensors configured to measure a comfort condition of the building zone 502, an IAQ of the building zone 502, a biological parameter of the building zone 502, and/or a safety parameter of the building zone 502. In some embodiments, for example, the one or more autonomous devices 510 include any of or a combination a temperature sensor, a humidity sensor, and/or a sensor configured to measure mean radiant temperature. In some embodiments, the one or more autonomous devices 510 include any of or a combination of a CO2 sensor, a PM 2.5 sensor, a PM 10 sensor, a sensor configured to measure VOC, a sensor configured to measure ozone, a sensor configured to measure ion concentration, and/or a sensor configured to measure light intensity or ultraviolet (UV) light. In some embodiments, the one or more autonomous devices 510 include a carbon monoxide sensor, a flammable gas sensor (e.g., a sensor configured to measure natural gas), a smoke detector (e.g., a sensor configured to measure soot, smoke, etc.), and/or a sensor configured to measure a presence or concentration of industrial chemicals (e.g., gaseous, liquid, particulate matter, etc.). In some embodiments, the one or more autonomous devices 510 include a sensor that is configured to measure, detect, sense, or otherwise sample air for a specific ribonucleic acid (RNA and/or DNA) (e.g., COVID-19 or any other virus). For example, in such embodiments, the one or more autonomous devices 510 may include a sensor that detects for DNA/RNA associated with a particular disease or pathogen to detect presence of the disease or pathogen. In various embodiments, any combination of the sensors discussed herein could be incorporated into the one or more autonomous devices 510 and used in combination or in isolation to detect conditions in the building zone 502.

Temperature in the building zone 502 may vary based on a wide variety of parameters, according to some embodiments. Obtaining a temperature mapping of the building zone 502 can facilitate achieving uniform comfort throughout the building zone 502, according to some embodiments. Mean radiant temperature is a component in human thermal comfort, according to some embodiments. Mean radiant temperature is a measure of how warm or cold surrounding walls of a space are. Obtaining mean radian temperature also facilitates achieving uniform comfort throughout the building zone 502, according to some embodiments. CO2 is a measure of an amount of ventilation that is provided per occupant of the building zone 502. High levels of CO2 may indicate insufficient ventilation. The CO2 of building zone 502 may vary spatially due to differences in HVAC airflow distribution, according to some embodiments. The PM 2.5 and PM 10 sensors are sensors that can be configured to measure an amount of particles in the air of the building zone 502. The PM 2.5 sensor can be configured to measure 2.5 micrometer particles, which may be harmful to occupants if inhaled in quantities greater than a particular level. The PM 10 sensor can be configured to measure an amount of 10 micrometer particles that are in the air of the building zone 502 and may be indicative of dust or dirt in the building zone 502. VOC can be a measure of volatile organic compounds in the building zone 502. In some embodiments, VOCs may be found in paints, cleaners, or other chemicals. A concentration of VOCs may vary throughout the building zone 502 due to variation in usage of paints, cleaners, chemicals, etc. Ozone can be a byproduct of high voltage electric discharge and may be detected near electronic devices. In some embodiments, air disinfection devices may generate ions for disinfecting the air. Measuring the ionic concentration in the building zone 502 can facilitate ensuring that uniform ionic concentration is achieved throughout the building zone 502. Carbon monoxide, industrial chemicals, or flammable gases can be "sniffed" out by the autonomous devices 510 by performing a sweep operation to identify a source of the carbon monoxide, the industrial chemicals, or the flammable gases (e.g., to detect gas leaks), according to some embodiments.

In some embodiments, the controller 506 and/or the base 504 are configured to use both position data obtained from the autonomous devices 510 and corresponding sensor data (e.g., temperature, humidity, IAQ, smoke detection, gas detection, etc.) to generate a map of variation of the sensor data throughout the building zone 502. In some embodiments, the controller 506 is configured to identify a location (e.g., position) of a maximum or a minimum of the sensor data (e.g., a location in building zone 502 where temperature is at a maximum, a location in building zone 502 where IAQ is lowest, etc.). Similarly, the controller 506 may generate a map of detected presences of particulate matter, specific DNA/RNA, etc., for various sensor data that is binary (e.g., indicating whether a presence is detected or not) and corresponding location for the detected presence.

In some embodiments, the autonomous devices 510 are configured to generate a positional mapping of the building zone 502 (e.g., while exploring the building zone 502 and determining different boundaries of the building zone 502). In some embodiments, dimensions (e.g. boundaries, size, floorplan, etc.) of the building zone 502 are known and stored in the controller 506. In some embodiments, the autonomous devices 510 can perform local control to determine the path 508 along which the autonomous devices 510 can travel through the building zone 502. In some embodiments, the path 508 is determined by the base 504 and/or the controller 506 (e.g., based on sensor data obtained from previous routes of the autonomous devices 510, based on real-time sensor data and position data obtained from the autonomous devices 510, etc.).

Figure 6:
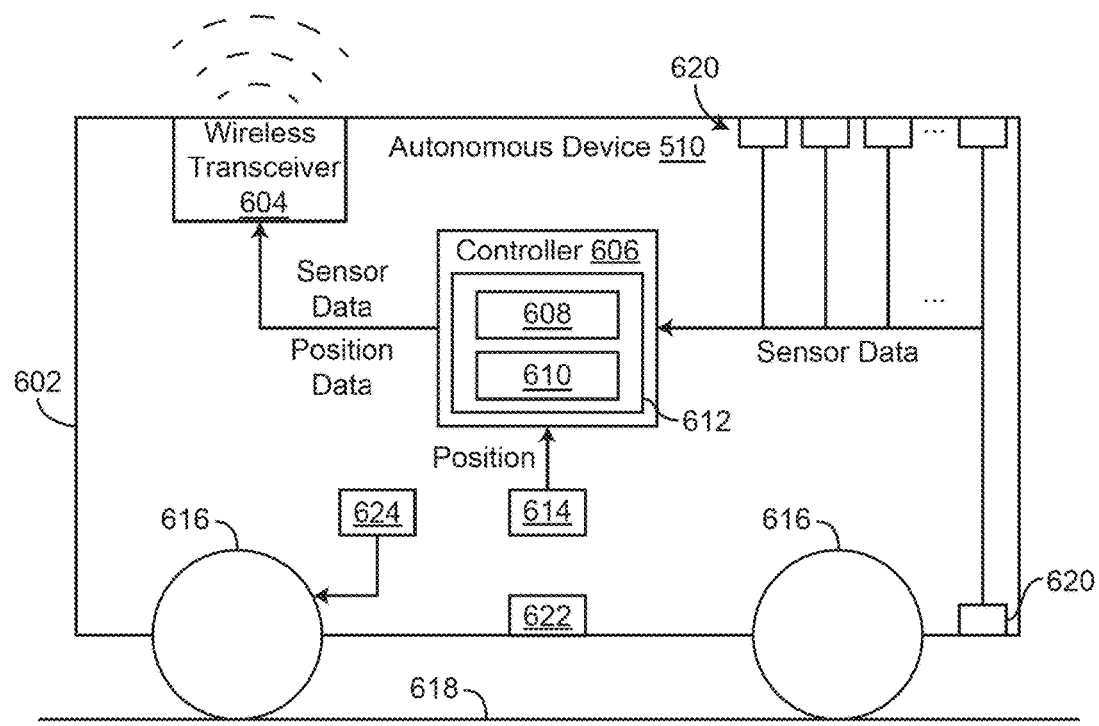
FIG. 6 is a diagram of one of the autonomous devices of FIG. 5, according to some embodiments.

Referring now to FIG. 6, one of the autonomous devices 510 is shown, according to some embodiments. The autonomous device 510 includes a body, housing, or frame 602, a controller 606, a wireless transceiver 604, one or more sensors 620, an apparatus 622, a position sensor 614, and an electric motor 624, according to some embodiments. In some embodiments, the autonomous device 510 includes one or more tractive components or elements 616 that are configured to engage a ground surface 618 of the building zone 502 to drive, transport, rotate, move, etc., the autonomous device 510 about the building zone 502 or through multiple building zones 502. In some embodiments, the tractive elements 616 are configured to receive a torque output from the electric motor 624 to drive the autonomous device 510 for transportation. In some embodiments in which the autonomous device is a ground-based vehicle, the tractive elements 616 may be or include wheels, tracks, or other elements for moving across the ground. In some embodiments in which the autonomous device 510 is a drone, the tractive elements 616 may be fans or impeller blades that are driven by the electric motor 624 or a set of electric motors.

The controller 606 is shown to include processing circuitry 612 including a processor 608 and memory 610, according to some embodiments. The processor 608 may be a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. The processor 608 may be a microprocessor, or, any conventional processor, controller, microcontroller, or state machine. Processor 608 also may be implemented as a combination of computing devices, such as a combination of a DSP and a microprocessor, a multiple microprocessors, one or more microprocessors in conjunction with a DSP core, or any other such configuration. In some embodiments, particular processes and methods may be performed by circuitry that is specific to a given function.

Memory 610 (e.g., memory, memory unit, storage device) may include one or more devices (e.g., RAM, ROM, Flash memory, hard disk storage) for storing data and/or computer code for completing or facilitating the various processes, layers and modules described in the present disclosure. Memory 610 may be or include volatile memory or non-volatile memory, and may include database components, object code components, script components, or any other type of information structure for supporting the various activities and information structures described herein. According to an exemplary embodiment, the memory 610 is communicably connected to the processor 608 via processing circuitry 612 and includes computer code for executing (e.g., by the processing circuit or the processor) the one or more processes described herein.

In some embodiments, the apparatus 622 is configured to perform different functionality of operations of the autonomous device 510 as the autonomous device 510 travels about the building zone 502. For example, the apparatus 622 may be a host device apparatus, such as a vacuum cleaning apparatus including a fan or an impeller blade, a canister for collected matter, and an electric motor (e.g., similar to the electric motor 624), according to some embodiments. As another example, the autonomous device 510 may be a drone, and the apparatus 622 may be a camera or other device that is a part of the drone and performs functions of the drone such as navigation and capturing images/video.

In some embodiments, the autonomous device 510 include one or more arrays of the sensors 620. For example, the sensors 620 may include a temperature sensor, a mean radiant temperature sensor, a humidity sensor, a CO2 sensor, PM 2.5 sensor, a PM 10 sensor, a sensor configured to measure a presence or concentration of one or more VOCs, an ozone sensor, a sensor configured to measure a concentration of a particular ion, a light intensity sensor, a UV light sensor, a sensor configured to measure a presence or concentration of a particular DNA/RNA in an air sample, a carbon monoxide detector, a natural gas sensor, a flammable gas sensor, a smoke detector, an industrial chemical detector, an IAQ sensor, a dirt sensor, an irradiance sensor, an imaging device, etc. In some embodiments, the autonomous device 510 includes a tubular member that extends from a top of the autonomous device 510 and is configured to obtain an air sample at an elevated distance from the autonomous device 510 (e.g., at a height at which an occupant exhales). If the autonomous device 510 is a vacuum cleaning device or robot, the autonomous device 510 may operate a vacuum cleaning apparatus or a fan of the vacuum cleaning apparatus to stir up dirt on the ground surface 618 so that consistent readings are obtained by the sensors 620.

In this way, the autonomous device 510 can obtain sensor data related to comfort (e.g., temperature, humidity, etc.), IAQ (e.g., particulate matter, CO2, etc.), biological matter (e.g., DNA/RNA, specific virus DNA/RNA, etc.), and/or safety (e.g., carbon monoxide, flammable gases, smoke, industrial chemicals, etc.). Any of the sensor data obtained by the sensors 620 of the autonomous device 510 can be provided to the controller 606, according to some embodiments. In some embodiments, the controller 606 is configured to also obtain a corresponding position of the autonomous device 510 (e.g., from the position sensor 614). In some embodiments, the controller 606 may store the sensor readings and/or position data as timeseries data or other data correlating the sensor readings and/or position data with a time at which the sensor and/or position data was collected. In some embodiments, the controller 606 may store the sensor readings and position data in a form that correlates the sensor readings to positions of the autonomous device 510 at which the sensor readings occurred. The controller 606 provides the sensor data and the position data to the controller 506 and/or the base 504 by operating the wireless transceiver 604, according to some embodiments. In some embodiments, the controller 606 operates the wireless transceiver 604 to provide the sensor data and the position data to the controller 506 in real-time or near-real time. In some embodiments, the controller 606 collects the sensor data and the position as the autonomous device 510 travels along its route and stores the sensor data and the position data in the memory 610. The controller 606 may then provide the sensor data and the position data to the controller 506 when the autonomous device 510 returns to the base 504, according to some embodiments.

It should be understood that while the position of the autonomous device 510 is shown obtained from a position sensor (e.g., the position sensor 614), the position of the autonomous device 510 (e.g., relative position of the autonomous device 510 in the building zone 502, relative to the base 504, etc.) may be obtained using different systems or methods. For example, the position of the autonomous device 510 may be obtained using a triangulation technique, according to some embodiments.

Figure 7:
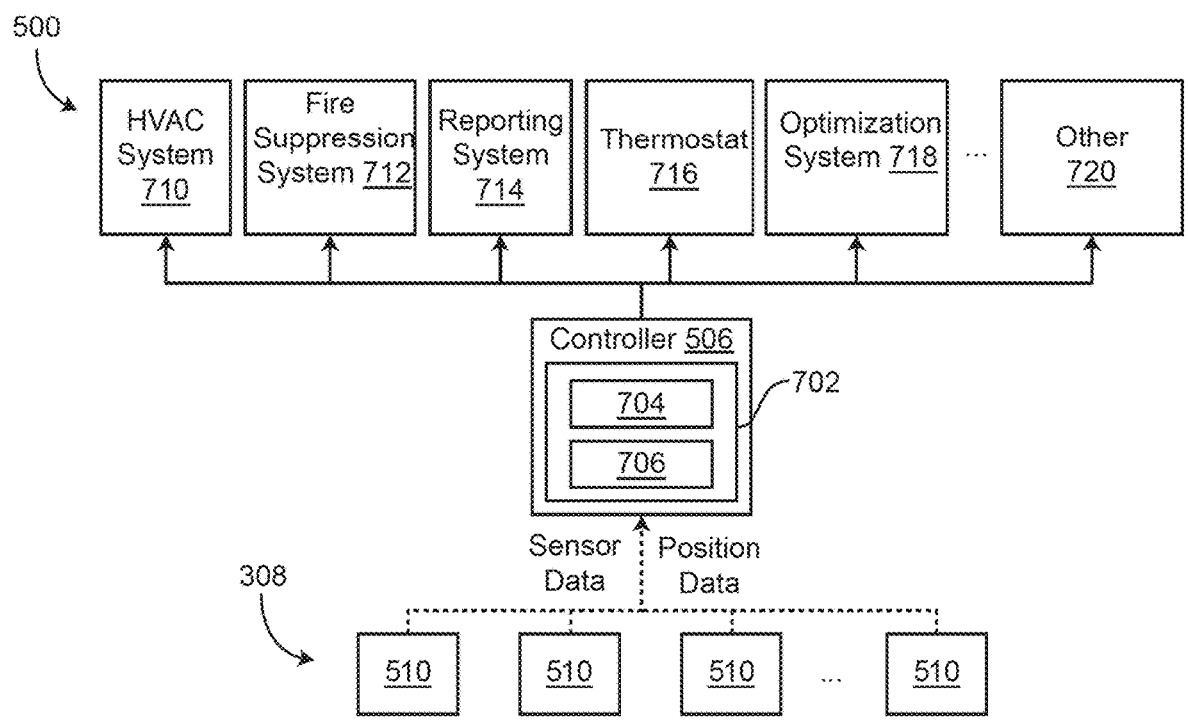
FIG. 7 is a block diagram of a control system for the IAQ system of FIG. 5 using inputs from one or more of the autonomous devices, according to some embodiments.

Referring now to FIG. 7, a portion of the system 500 is shown, according to some embodiments. Specifically, FIG. 7 shows a control system of the system 500, according to some embodiments. The control system includes the controller 506, one or more of the autonomous devices 510 (e.g., a fleet of the autonomous devices 510), an HVAC system 710, a fire suppression system 712, a reporting system 714, a thermostat 716, an optimization system 718, etc., or another system or device 720, according to some embodiments. In some embodiments, the controller 506 is configured to receive sensor data and position data from the fleet of the autonomous devices 510 (e.g., in real-time, near real-time, intermittently, etc.). The controller 506 may generate control signals and/or reporting data (e.g., the sensor data, the position data, a mapping of sensor data, an identification of a location where a virus-specific DNA/RNA is detected, etc.) to any of the HVAC system 710, the fire suppression system 712, the reporting system 714, the thermostat 716, the optimization system 718, or any other system or device 720. In some embodiments, the controller 506 is configured to adjust an operation of any of the HVAC system 710, the fire suppression system 712, the reporting system 714, the thermostat 716, the optimization system 718, and/or another system or device 720 using the sensor data and/or the position data obtained from any of or a combination of the autonomous devices 510.

In some embodiments, the fleet includes autonomous devices 510 deployed in different spaces or different zones of spaces, such that the fleet together covers different areas of a building. In some embodiments, the autonomous devices 510 of the fleet may be configured to communicate data directly to one another (e.g., via peer-to-peer communication, such as wireless communication, e.g., via a mesh networking configuration) or indirectly via the controller 506. For example, in some embodiments, one autonomous device 510 may detect presence of a certain condition (presence of an air quality condition, such as a sensed air quality level below a threshold, presence of a contaminant or a virus, etc.) and communicate an indication of the detection to another autonomous device 510 and/or to the controller 506 for use in taking action with respect to other areas or zones (e.g., warning occupants of the presence of the air quality/contaminant issue, restricting access to the space, etc.).

The HVAC system 710 can be any system, device, collection of devices, building equipment, etc., that is configured to operate to affect an environmental or variable condition (e.g., temperature, humidity, etc.) of the building zone 502, according to some embodiments. The fire suppression system 712 may be an alert system (e.g., a fire alarm system, a fire panel, etc.) and/or a fire sprinkler system configured to extinguish a fire to either alert occupants of the building zone 502 regarding a presence of fire in the building zone 502, and/or to suppress the fire, according to some embodiments. The reporting system 714 may be a remote system that is configured to aggregate, analyze, and report data (e.g., providing graphical user interfaces, etc.) to a user, an occupant, a building administrator, another system, etc., according to some embodiments. The thermostat 716 may be a processing device (e.g., a wall mounted thermostat including a user interface or a touchscreen) that is configured to obtain environmental condition data of the building zone 502 and operate building equipment or the HVAC system 710 of the building zone 502, according to some embodiments. The optimization system 718 can be a system identification system that is configured to estimate, predict, or calculate one or more thermal properties of the building zone 502, a model predictive system, or any other optimization system configured to use data to determine one or more high-level control decisions to minimize energy consumption of a building, maximize efficiency of various systems or sub-systems of the building, etc., according to some embodiments. The other systems or devices 720 can include personal computing devices (e.g., technician smartphones), a fault diagnostics system, a remote database, a remote optimization or analytic system, etc., according to some embodiments.

The controller 506 is shown to include processing circuitry 702 including a processor 704 and memory 706, according to some embodiments. The processor 704 may be a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. The processor 704 may be a microprocessor, or, any conventional processor, controller, microcontroller, or state machine. Processor 608 also may be implemented as a combination of computing devices, such as a combination of a DSP and a microprocessor, a multiple microprocessors, one or more microprocessors in conjunction with a DSP core, or any other such configuration. In some embodiments, particular processes and methods may be performed by circuitry that is specific to a given function.

Memory 706 (e.g., memory, memory unit, storage device) may include one or more devices (e.g., RAM, ROM, Flash memory, hard disk storage) for storing data and/or computer code for completing or facilitating the various processes, layers and modules described in the present disclosure. Memory 706 may be or include volatile memory or non-volatile memory, and may include database components, object code components, script components, or any other type of information structure for supporting the various activities and information structures described herein. According to an exemplary embodiment, the memory 706 is communicably connected to the processor 704 via processing circuitry 702 and includes computer code for executing (e.g., by the processing circuit or the processor) the one or more processes described herein.

The controller 506 can be configured to generate a mapping for any of the sensor data obtained from the autonomous devices 510 using the position data, according to some embodiments. For example, the controller 506 can generate a mapping of variation or presence of any of temperature, humidity, mean radiant temperature, carbon dioxide, PM 2.5 sensor data, PM 10 sensor data, VOC, ozone, ion concentration, light intensity, UV light intensity, carbon monoxide, flammable gas (e.g., natural gas), smoke or soot, industrial chemicals, specific DNA/RNA (e.g., virus-specific DNA/RNA), etc., with regards to position or location of the building zone 502. For example, the mapping can show positional or locational variation of the temperature, humidity, etc., throughout the building zone 502, according to some embodiments.

The controller 506 can use the mapping for any of the sensor data with respect to location of the building zone 502 to generate updates, activation signals, control signals, alert signals, display data, diagnostic data, system information (SI) data, etc., or other data related to sensed variables conditions of the building zone 502 for any of the HVAC system 710, the fire suppression system 712, the reporting system 714, the thermostat 716, the optimization system 718, and/or any other system or device 720 (e.g., a personal computing device, a technician system, a building automation system, a building administration system, a security system, etc.). For example, if the sensor data obtained from different positions or locations throughout the building zone 502 indicates poor IAQ, the controller 506 can operate the HVAC system 710 to increase ventilation to the building zone 502, according to some embodiments. Similarly, if the sensor data obtained from different locations or positions in the building zone 502 indicates that a fire is detected at a particular location in the building zone 502, the controller 506 can provide an alert to the fire suppression system 712, according to some embodiments.

Referring generally to FIGS. 5-7, the autonomous devices 510 can facilitate obtaining information regarding IAQ or particulate matter concentration throughout the building zone 502, according to some embodiments. The autonomous devices 510 can function as mobile or variable position IAQ sensors that are configured to obtain different IAQ sensor data (e.g., by drawing and sampling air samples) throughout the building zone 502, according to some embodiments. In some embodiments, the controller 506 is a thermostat that is configured to operate the HVAC system 710 and can use IAQ-related sensor data obtained from the autonomous devices 510 to operate the HVAC system 710 to achieve a desired IAQ (e.g., a desired particulate matter concentration in the building zone 502, a desired CO2 concentration in the building zone 502, etc.). Advantageously, using the autonomous devices 510 to obtain IAQ-related sensor data reduces costs that may be associated with installing and maintaining IAQ sensors throughout the building zone 502. The autonomous devices 510 can thereby facilitate improved clean air in the building zone 502 by obtaining IAQ sensor data from throughout the building zone 502, and providing the obtained IAQ sensor data from different positions or locations in the building zone 502 to a thermostat (e.g., the thermostat 716, the controller 506, etc.).

In some implementations, utilizing the autonomous devices 510 may allow for more granular/accurate detection of IAQ in the space/building. IAQ systems relying on a fixed network of sensors, even if multiple sensors are provided within the space/zone, can only sense the conditions of the air at or near the fixed locations. In contrast, the autonomous devices 510 can sense the conditions anywhere within the space that the autonomous devices 510 can move. As a result, the autonomous devices 510 can sample IAQ conditions throughout the space. In some implementations, the system may use a combination of fixed sensors and sensors on the autonomous devices 510 to sample conditions, such that the system can obtain more frequent readings, or even substantially continuous readings, of IAQ conditions in locations where the fixed sensors are located and periodic or less frequent readings of IAQ conditions using the autonomous devices 510.

Referring still to FIGS. 5-7, in some embodiments, the autonomous devices 510 are dispatched at scheduled intervals to collect sensor data from throughout the building zone 502 (e.g., from different locations in the building zone 502). For example, the autonomous devices 510 may be dispatched to travel throughout the building zone 502 several times a day to obtain multiple daily mappings of sensor data or conditions with respect to location. Advantageously, obtaining such sensor data and/or mappings can facilitate improved real-time operation of any of the HVAC system 710, the fire suppression system 712, the reporting system 714, the thermostat 716, the optimization system 718, and/or any other system or device 720 of the building zone 502 (e.g., a lighting system).

Referring still to FIGS. 5-7, any of the sensors 620 or arrays of sensors can be electrically, communicably, or fixedly coupled with the autonomous device 510 (e.g., communicably connected with the controller 606 and fixedly coupled with the body 602) in a modular unit, according to some embodiments. In some embodiments, different modular units can be plugged into a corresponding port of the autonomous device 510 to fixedly couple the modular unit with the autonomous device 510 and communicably couple different sensors of the modular unit with the controller 606. For example, different modular units (e.g., a residential modular unit including specific sensors that are relevant for a residential application, a manufacturing-specific modular unit including specific sensors that are relevant for the manufacturing-specific application, etc.) can be removably coupled with the corresponding port of the autonomous devices 510, according to some embodiments. Advantageously, this facilitates ease of removal and installation of sensors depending on the application. Providing the sensors 620 in different modular units also allows the sensors 620 to be retrofit with the autonomous device 510, according to some embodiments. In some implementations, the controllers 606 of the autonomous devices 510 may be configured to sense the modular unit(s) connected to the autonomous devices 510 and enable/disable functions of the autonomous devices 510 in response, such as by enabling IAQ monitoring functions in response to an IAQ sensor being connected, infection response functions in response to an infection-related DNA/RNA sensor being connected, etc.

Referring still to FIGS. 5-7, the autonomous devices 510 can operate in a target-based manner to identify a location that a particular condition originates from, according to some embodiments. For example, if the autonomous devices 510 detect an unusual or excessively high or low sensor value (e.g., light intensity and/or UV light intensity indicating a presence of fire, low air quality reading, etc.), the autonomous devices 510 can be dispatched to identify an originating location in the building zone 502 resulting in the unusual, excessively high or low, or otherwise undesired sensor value, according to some embodiments. The autonomous devices 510 can perform a sweep of the building zone 502 to determine a location or a position in the building zone 502 from which the particular matter, the virus-specific DNA/RNA, etc., or any other undesired condition originates. For example, if one or more of the autonomous devices 510 detect a virus-specific DNA/RNA or a specific chemical presence, the autonomous devices 510 may perform a sweep (e.g. being dispatched from the base 504) to identify an originating location of the virus-specific DNA/RNA or the specific chemical presence within the building zone 502, according to some embodiments. Similarly, these features may be implemented to identify a location of a fire in the building zone 502, according to some embodiments. In some embodiments, the autonomous devices 510 are configured to provide their sensor data and position data to the controller 506 in real-time while performing the sweep of the building zone 502.

Referring still to FIGS. 5-7, the autonomous devices 510 can include a sensor configured to detect a presence or concentration of a virus-specific DNA/RNA (e.g., COVID-19), according to some embodiments. In some embodiments, the autonomous devices 510 include a fan that is configured to operate to draw an air sample across a filter. Different matter, quanta, or virus-specific DNA/RNA may be trapped on the filter, and can be sensed or detected, according to some embodiments. In some embodiments, the sensor that is configured to detect the virus-specific DNA/RNA uses existing infrastructure (e.g., a fan of a vacuum cleaning apparatus) of the autonomous devices 510. In this way, the apparatus 622 may have a dual-use, both for performing an operation and for performing sensing operations.

Referring still to FIGS. 5-7, the autonomous devices 510 can include one or more aural alert devices (e.g., speakers) and/or one or more visual alert devices (e.g., an array of light emitting diodes (LEDs)), according to some embodiments. In some embodiments, the autonomous devices 510 are configured to operate to provide a visual alert and/or an aural alert to occupants in the building zone 502 in response to the sensor data. For example, if the sensor data indicates that a virus-specific DNA/RNA is detected in the building zone 502 or that a fire or smoke is detected in the building zone 502, a visual and/or an aural alert can be provided to occupants of the building zone by activating or operating the one or more aural alert devices and/or the one or more visual alert devices.

Controller 506 may, in various embodiments, be a part of a building management system (BMS) or otherwise integrate with and/or communicate with a BMS that controls various systems of the building. The BMS may control HVAC, security, lighting, and/or other systems of the building using the data collected by the autonomous devices 510, in various implementations. For example, in some implementations, the controller 506 may be configured to transmit requests or control signals to the BMS and/or devices of the BMS to modify operation of the BMS based on a condition of the space sensed by the autonomous devices 510. In some implementations, in response to detecting an IAQ condition (e.g., IAQ level below a threshold air quality), the controller 506 may cause the BMS to control HVAC devices, such as air handling units (AHUs) and/or variable air volume (VAV) devices to increase a volume of outside air delivered to the space. In some implementations, the controller 506 may additionally or alternatively respond to such an IAQ condition by activating additional filtering to the air in and/or being delivered to the zone, such as by adding new filters and/or applying different filters to the incoming air at an AHU/VAV and/or activating one or more in-zone filtration devices. In some such implementations, the filtration devices may be activated based on the location of the autonomous devices 510 where the IAQ condition was sensed; for example, the system may include multiple in-zone filtration devices, and the in-zone filtration devices closest to the position of the autonomous devices 510 where the IAQ condition was sensed may be activated. Similar functionality could be provided in response to a sensed presence of a virus/pathogen/contagion.

Similarly, the controller 506 may additionally or alternatively control other systems of the BMS based on the sensed condition. In some implementations, the controller 506 may control security devices (door locks, entry gates, etc.) to restrict access to a space where an air quality or contamination issue is detected. In some implementations, the controller 506 may control fire system devices (e.g., sprinkler systems, alarms, etc.) based on detection of smoke or other indications of fire within the space. Various other systems may be controlled based on the sensed conditions and are contemplated within the scope of the present disclosure.

Figure 8:
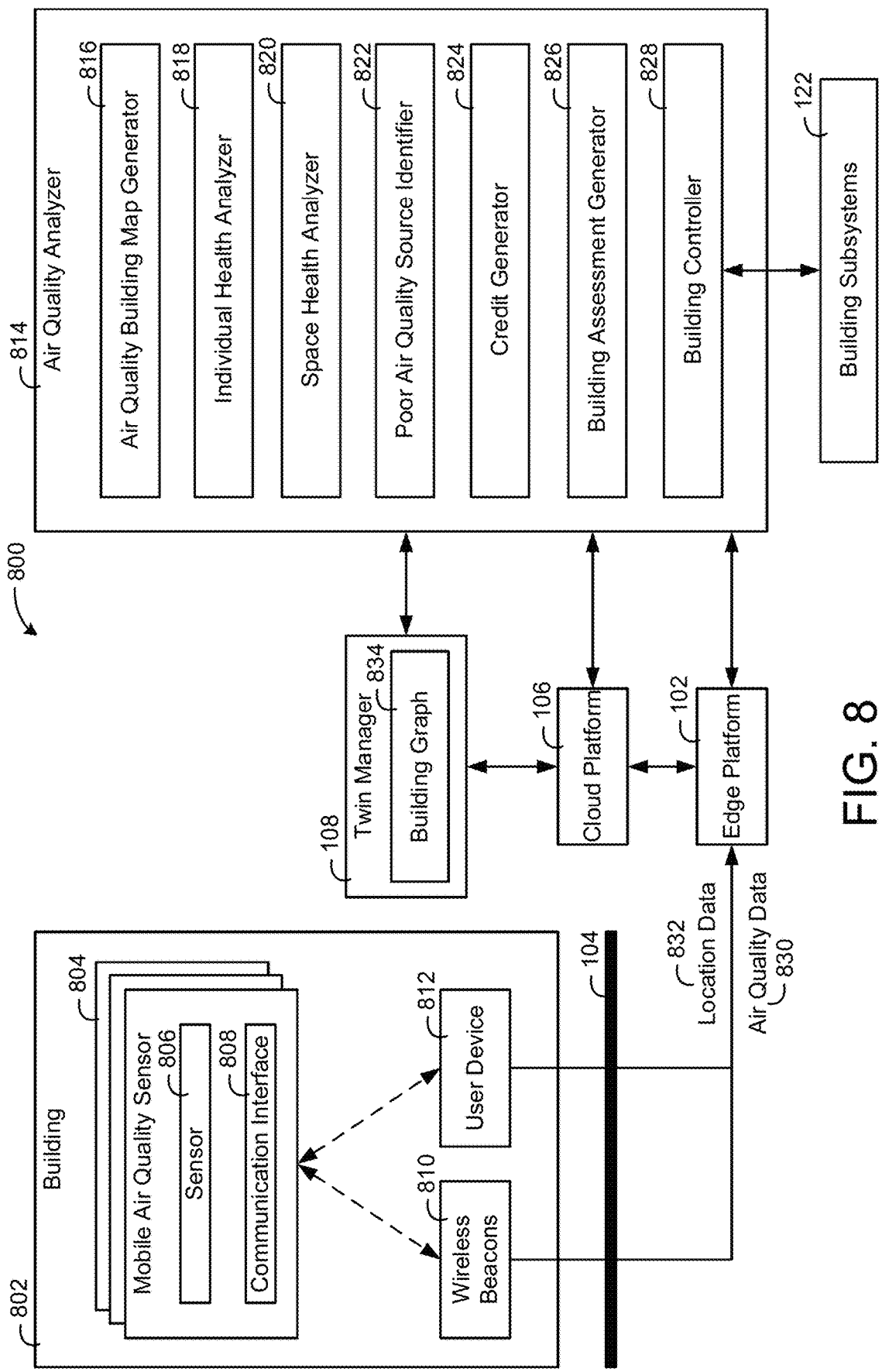
FIG. 8 is a block diagram of a system where a mobile air quality sensor collects air quality data of a building that is analyzed by an air quality analyzer, according to an exemplary embodiment.

Referring now to FIG. 8, a system 800 where a mobile air quality sensor 804 collects air quality data 830 of a building 802 that is analyzed by an air quality analyzer 814 is shown, according to an exemplary embodiment. The building 802 can be a school, a hospital, a factory, a commercial building, an apartment complex, a sky rise, etc. In some embodiments, the system 800 can be applied to non-building environments, e.g., cities, towns, transit systems, etc. One or multiple mobile air quality sensors 804 may move, transport, or travel around various areas of the building 802 making sensor measurements of the various spaces of the building 802. The mobile air quality sensor 804 could be a drone (e.g., flying quadcopter), a robot (e.g., with legs or wheels), or any other type of mobile device or system. Examples of a robot with air quality sensors can be found in FIGS. 5-7. The drone or robot can move through various spaces, floors, zones, rooms, or other areas of the building 802.

The mobile air quality sensor 804 can be a wearable device. An occupant, user, or individual can carry or wear the mobile air quality sensor 804 while the occupant moves, e.g., moves throughout the various spaces of the building 802. The user can move the mobile air quality sensor 804 through spaces of a building 802 based on the movements of the user. The wearable device can include a strap or connecting component that allows the occupant to carry the wearable device. The strap can allow the user to wear or carry the wearable device. The strap or connecting component can be a necklace, a watch, a lanyard, a ring, a key-chain, a handle, etc. The wearable device, when a user moves through the building 802, can collect indoor air quality (IAQ) data 830 of the various routes that the user takes through the building 802. Multiple different individuals, employees, students, teachers, tenants, etc. may move throughout the building 802 with the wearable device while the wearable device measures the air quality data 830 of the various spaces of the building.

The mobile air quality sensor 804 includes a sensor 806. The sensor 806 can be an air quality sensor. The sensor 806 can measure and collect air quality data 830 such as particulate or particular levels (e.g., PM1, PM2.5, PM10, etc.). The sensor 806 can measure VOCs or TVOCs or levels of VOCs or TVOCs. The sensor 806 can measure temperature, humidity, carbon monoxide or carbon monoxide level, carbon dioxide or carbon dioxide level, air flow, nitrogen dioxide (NO2) or a NO2 level, etc. In some embodiments, the mobile air quality sensor 804 also includes a sound sensor. The sound sensor can measure audio levels (e.g., signal levels) through the building 802. For example, in a factory, it may be important for employees to wear hearing protection in loud areas of the factory. If an employee wears the sensor 804, the system 800 can identify areas in the building 802 that the employee should wear hearing protection. Furthermore, the system 800 could identify which employees of the building 802 may have been exposed to loud sounds and/or to loud sounds for a long duration. The system 800 can identify that employees exposed to high doses of loud sound may need medical attention, provided with high quality hearing protection, should work in a quieter location (e.g., indicated by measurements of the sensor 804), etc. The mobile air quality sensor 804 can include one or multiple sensors 806. Each sensor 806 can measure a different environmental condition of the building 802. At least some of the sensors 806 can be duplicative sensors measuring the same environmental condition of the building 802.

The mobile air quality sensor 804 includes a communication interface 808. The communication interface 808 can include one or more wired and/or wireless communications interfaces, radios, transceivers, transmitters, receivers, etc. The communication interface 808 can communicate with wireless beacons 810 of a building and/or a user device 812. The communication interface 808 can communicate the location data 832 and/or the air quality data 830 to the edge platform 102 via the network 104 or communicate the data to the wireless beacons 810 and/or the user device 812. The user device 812 can be a smartphone that the user who is wearing the sensor 804 carries. The sensor 804 can communicate, e.g., via Bluetooth, Bluetooth Low Energy, Wi-Fi, LoRa, etc., with the user device 812 or the wireless Beacons 810. The user device 812 can communicate sensor measurements of the sensor 804 and location data 832 collected by the user device 812 (e.g., via GPS) to the edge platform 102 via one or more networks, e.g., a Wi-Fi network, a 4G network, a 5G network, a 6G network, a LAN, WAN, MAN, or other network. The edge platform 102, the cloud platform 106, or the twin manager 108 can receive the location data 832 or the air quality data 830 from the mobile air quality sensor 804, from the wireless beacons 810, or the user device 812.

In some embodiments, the sensor 804 communicates with one or more wireless beacons 810 of the building 802. The sensor 804 could, in some embodiments, be a key fob, identification card, or other device carried by a user that communicates with the wireless beacons 810. The wireless beacons 810 can locate or triangulate the sensor 804 (e.g., via Bluetooth signals) based on signals of the wireless beacons 810 sensed by the communication interface 808 to determine the locations of the sensor 804. The wireless beacons 810 can communicate the measurements for the sensor 804 and/or the determined location of the sensor 804 to the edge platform 102. Examples of location tracking techniques that can be implemented by the mobile air quality sensor 804 and the wireless beacons 810 can be found in U.S. patent application Ser. No. 17/220,795 filed Apr. 1, 2021.

The air quality data 830 can include measurements collected by the mobile air quality sensor 804. The mobile air quality sensor 804 can be configured to collect the air quality data 830 by measuring environmental conditions via the sensors 806 while the mobile air quality sensor 804 moves throughout the building 802 or through spaces of the building 802. The measurements can be stored by the mobile air quality sensor 804 and transmitted or provided to the wireless beacons 810 or the user device 812 for communication to the edge platform 102. The air quality data 830 can be collected and stored by the mobile air quality sensor 804 until a connection to the edge platform 102, the wireless beacon 810, or the user device 812 is available. The air quality data 830 can be event data including measurements and a timestamp. The air quality data 830 can be a time correlated data stream, e.g., a timeseries of values for each environmental condition measured. The air quality data 830 can be any data packet, data message, data file, or other data structure that stores a value indicating a measurement of at least one environmental condition and a time at which the measurement was measured or collected by the mobile air quality sensor 804.

The edge platform 102 can receive the location data 832 and/or the air quality data 830 from the sensor 804, e.g., via the wireless beacons 810 and/or the user device 812. The edge platform 102 can communicate with the cloud platform 106 and/or the twin manager 108 to integrate the received data with the various components of the twin manager 108, e.g., data enrichment, integration of the data into a building graph 834. The building graph 834 can be a graph data structure, an entity database, a graph database, or any other semantic data structure. For example, the twin manager 108 can ingest, store, or add information (or a link to the information) into the building graph 834 based on the received air quality data 830 or the location data 832. The link to the information could be a resource locator referencing another database, e.g., a timeseries database, that stores the values of the information represented by the link. The link, or the information itself, can be stored in nodes of the building graph 834, e.g., in properties or other data elements of the nodes.

The building graph 834 can include various nodes and edges between the nodes. The nodes can represent entities of the building 802, e.g., spaces of the building 802, the building 802 itself, equipment of the building (e.g., the mobile air quality sensor 804 and/or the building subsystems 122), measured data (e.g., the air quality data 830, information derived from the air quality data 830 by the air quality analyzer 814), event data, events, people, or any other entity of the building. The edges between the nodes can represent relationships between the nodes, e.g., spatial relationships or functional relationships. The spatial relationships can indicate how entities are related spatially, e.g., whether a space is located on a floor, whether a piece of equipment is located in a space, etc. The functional relationships can indicate control or operational relationships between the entities, e.g., a controller operates a damper, a data collector collects data from a sensor, an AHU provides air to a VAV, etc. Through the nodes and edges of the building graph 834, the building graph 834 can represent contextual representations of the building 802 and the entities of the building 802 and also information based on the air quality data 830. The air quality analyzer 814 can query the building graph 834 for data, e.g., the nodes or edges representing the contextual information of the building 802 and/or the information stored in the building graph 834 based on the location data 832 or the air quality data 830. The air quality analyzer 814 can perform operations such as building operations for the building 802 based on the data queried from the building graph 834, e.g., the contextual data of the building 802, the location data 832, and/or the air quality data 830. The air quality analyzer 814 can operate based on the queried information to perform operations or control environmental conditions of the building by controlling the building subsystems 122.

The air quality analyzer 814 can receive the location data 832 and/or the air quality data 830 and perform an analysis on the air quality data 830 and location data 832 to generate actions. The actions can be installing equipment, setting policies for the building 802, operating equipment to implement increased filtration, increased air changes (e.g., bring in more outdoor air in to the building 802 and discharge air from within the building 802 out of the building 802), etc. The analyzer 814 includes an air quality building map generator 816, an individual health analyzer 818, a space health analyzer 820, a poor air quality source identifier 822, a credit generator 824, a building assessment generator 826, and a building controller 828. The results of the analysis and/or actions performed by the air quality analyzer 814 can be an improvement to IAQ. Improving IAQ can increase employee productivity within the building 802. This may offset any additional costs that result from the actions, e.g., control actions, taken by the analyzer 814 to improve the air quality of the building 802.

In some embodiments, the air quality analyzer 814 can evaluate the air quality associated with movements of employees both within the building 802 and at home. Because employees may work from home and work from the office, the air quality analyzer 814 can track air quality across the various spaces that the employee occupies. In some embodiments, the air quality analyzer 814 can provide the employee with an insurance program that credits the employee for monitoring their IAQ. An insurance portal could further recommend filters, ventilation, etc. for the building 802 and/or personal spaces associate with the employee. In some embodiments in which the sensor 804 is wearable or otherwise moves with the employee, the sensor 804 may provide a very specific individualized indication of the overall air quality experienced by the employee.

The air quality building map generator 816 can be configured to generate a heat map of various spaces of the building 802. The heat map can indicate, via a color coded heat signature, spaces of the building 802 with higher and lower air quality, e.g., higher or lower levels of VOC, particulate, humidity, etc. The map may be indicative of ventilation through the building 802, e.g., areas with higher ventilation may have higher air quality while areas with lower ventilation may have lower air quality. The analyzer 814 can determine which areas of the building 802 have the lowest air quality.

The individual health analyzer 818 can be configured to determine health levels for individuals based on the air quality data 830 and/or the location data 832. For example, the individual health analyzer 818 can be configured to determine a score indicating how much poor air quality an individual has been exposed to within the building 802. The score can indicate a length of time that a user was exposed to particular levels, VOCs levels, etc. above a particular level. In some embodiments, the score and/or underlying data can be a component of a broader score or assessment that takes employee health and/or air quality into account, such as a building or space health score with multiple component factors. Examples of multiple level health scoring is described in U.S. patent application Ser. No. 17/708,661 filed Mar. 30, 2022.

In some embodiments, the individual health analyzer 818 can determine air quality metrics for certain employee roles and/or employee teams. In some embodiments, a certain employee role may be experiencing higher than normal and/or lower than acceptable levels of air quality. For example, individuals working in a painting area of a factory may have higher than average VOC levels. The individual health analyzer 818 could identify the role of painting as a dangerous role and/or operate to improve the air quality in areas were individuals of the painter role are working since they may be using paints that give off high levels of VOC. The credit generator 824 can be configured to determine that employees of the painter role may be due a credit to compensate for their exposure to the high levels of VOC.

In some embodiments, the individual health analyzer 818 can identify that certain teams of the building 802 are exposed to poor air quality. Certain teams may be exposed to high levels of particulate, for example. The individual health analyzer 818 can identify the teams exposed to the high levels of particular and generate a recommendation to move the team to a new area of the building 802 so that the team is in a safer environment.

The poor air quality source identifier 822 can be configured to identify sources of poor air quality within the building 802. For example, certain pieces of equipment may not be operating properly and might be emitting high levels of VOCs. The space health analyzer 820 can correlate the locations of equipment with the air quality map generated by the generator 816 to determine which pieces of equipment may be a source of VOCs.

In some embodiments, the building 802 is a factory environment. Some areas of the factory may have dirty air. The space health analyzer 820 can identify the location data 832 and/or the air quality data 830 to determine areas of the factory that have low air quality and may be dangerous (e.g., due to chemical usage in various areas of the building, due to paints used in the building, etc.). The analyzer 814 can determine to add and/or operate ventilation or filtration equipment in the low air quality areas of the factory to address the air quality issues. Furthermore, the space health analyzer 820 could be configured to determine paths through the building 802 that have high or low air quality.

The credit generator 824 can be configured to determine reimbursement credits for employees. Some employees that are exposed to high levels of chemicals may be owed hazard pay, e.g., reimbursement for the risks that they take. The credit generator 824 can identify a length of time that the employee is exposed to poor air quality can be used by the credit generator 824 to determine the level of reimbursement that the employee is owed.

The building assessment generator 826 can be configured to generate a summary report for the building 802 based on air quality sensors that are temporarily present in the building 802. For example, the sensors 804 could be temporarily worn or carried by employees of the building 802 (e.g., for a day, week, or month). Furthermore, the sensors 804 could be carried in and/or clipped onto backpacks of students of a school. The generator 826 can generate the report to include information determined by the analyzer 814. Examples of a temporary air quality analysis with the sensors 804 can be found in U.S. Provisional Application No. 63/230,608 filed Aug. 6, 2021, the entirety of which is incorporated by reference herein.

The building controller 828 can be configured to operate the building subsystems 122 to improve the air quality of the building 802. The building controller 828 can be configured to operate ventilation equipment, filtration equipment, increase outdoor air, etc. The building controller 828 can determine to operate to improve the air quality of spaces determined by the analyzer 814 to have air quality below particular levels. The building controller 828 can be configured to operate at least one piece of building equipment of the building subsystems 122 based on the location data 832, the air quality data 830, the contextual data of the building graph 834, or any other information. The building controller 828 can control operation of the building subsystems 122 to control a environmental condition of at least one space of the building 802.

In some embodiments, the building controller 828 can use the location data 832 of the air quality sensors 804 to determine the locations of occupants. The building controller 828 can combine the locations of occupants with the air quality data 830 to determine which spaces require adjustments to their operation and/or need new equipment. In some embodiments, the building controller 828 can prioritize high occupancy spaces of the building 802 over low occupancy spaces of the building 802. Furthermore, once occupancy is prioritized, the controller 828 can prioritize low air quality spaces over high air quality spaces.

In some embodiments, the system 800 can be integrated with emergency response systems. For example, standard operating procedure (SOP) pipelines can utilize the location data 832 and/or air quality data 830 of various occupants of the building 802 received from the sensor 804 to respond to an emergency. Examples of SOP pipelines can be found in U.S. Patent Application No. 62/726,811 filed Sep. 4, 2018, U.S. Provisional Application No. 62/830,892 filed Apr. 8, 2019, U.S. patent application Ser. No. 16/559,318 filed Sep. 3, 2019, and U.S. patent application Ser. No. 17/062,003 filed Oct. 2, 2020, the entireties of which are incorporated by reference herein.

In some embodiments, the system 800 can be used to help evacuate individuals from the building 802. For example, the sensors 804 can transmit location and air quality information to a system and/or devices of individuals evacuating the building (e.g., police, firefighters, etc.). In some embodiments, the system 800 can be used to help evacuate individuals from the building 802 by helping prioritize individuals for evacuation. The air quality data 830 can indicate the risk levels of users, e.g., carbon dioxide levels, carbon monoxide levels, etc. Higher levels of carbon dioxide or carbon monoxide can indicate smoke and fire. Individuals in high levels of smoke can be prioritized for evacuation. In some embodiments, the prioritization can be converted into directions for the individuals performing the evacuation by the SOP pipeline.

Figure 9:
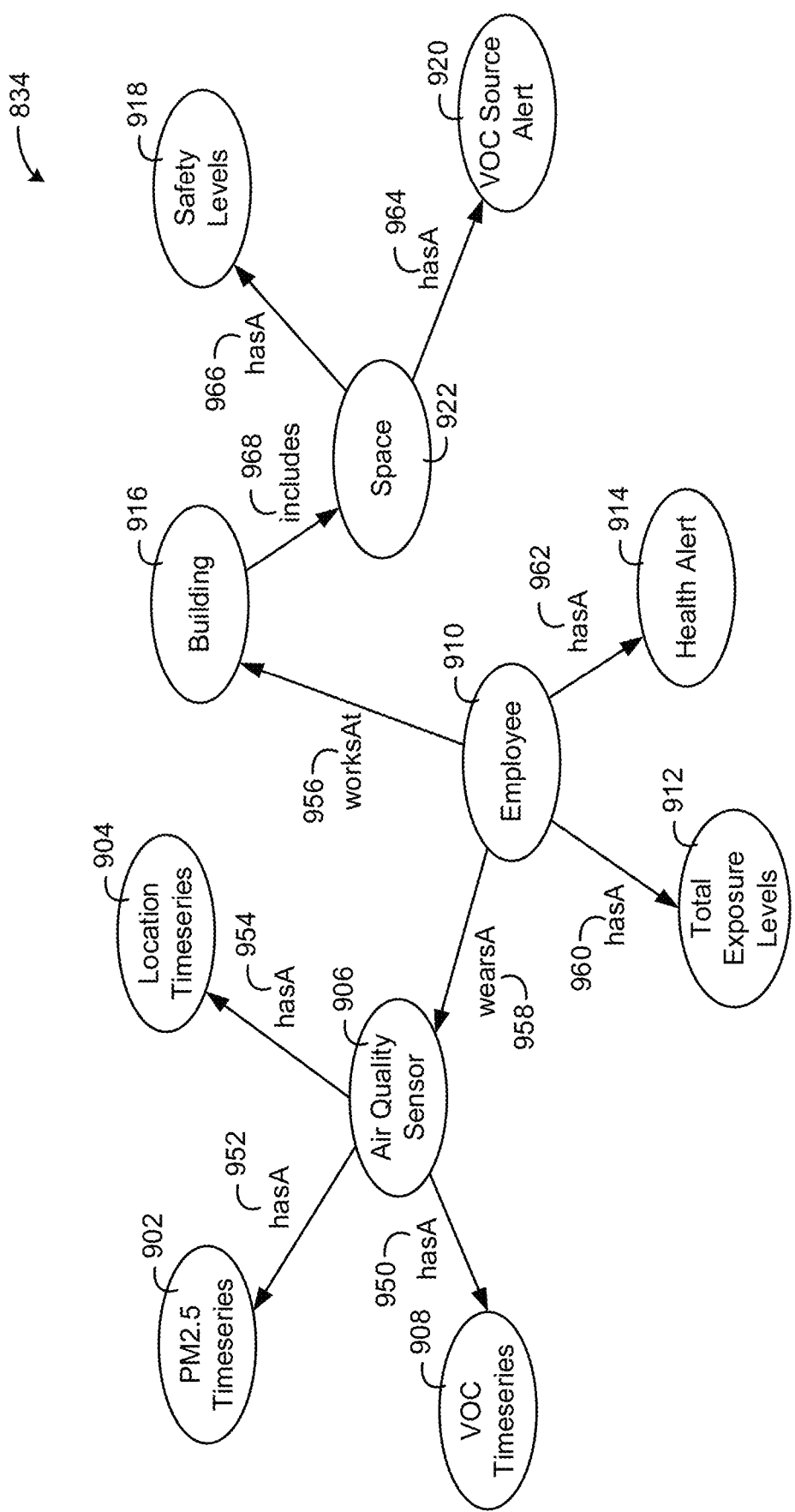
FIG. 9 is a graph including nodes and edges that represent the mobile air quality sensor of FIG. 8, timeseries data collected by the mobile air quality sensor of FIG. 8, and information derived based on the timeseries data, according to an exemplary embodiment.

Referring now to FIG. 9, the graph 834 including nodes 902-922 and edges 950-966 that represent the mobile air quality sensor 804, timeseries data collected by the mobile air quality sensor 804, and information derived based on the timeseries data is shown, according to an exemplary embodiment. The graph 834 can be a building graph, a digital twin, an entity graph, a graph data structure, a graph database, a database, etc. The graph 834 can be a graph projection of the graph projection database 162 described with reference to FIGS. 1-4. The graph 834 can be combined with an artificial intelligence or other application (e.g., the air quality analyzer 814 and/or component of the analyzer 814) to form a digital twin. The digital twin can be a digital twin of a person, of a building, of a space, of the sensor 804, etc. Graph and twin related concepts can be found in U.S. patent application Ser. No. 17/354,338 filed Jun. 22, 2021, the entirety of which is incorporated by reference herein. The graph 834 can be managed and/or updated by the twin manager 108 as the data of the sensor 804 is received. The graph 834 can store a real-time and/or dynamic contextual representation of a person, building, and/or sensor.

The graph 834 includes an air quality sensor node 906 representing the sensor 804. The sensor 804 can be worn or carried by a particular employee, user, or occupant represented by the employee node 910. The employee represented by the employee node 910 can be related to the air quality sensor 804 via the "wearsA" edge 958 between the employee 910 and the sensor node 906. The edge 958 between the node 906 and the node 910 can indicate that the user wears, caries, or otherwise moves the mobile air quality sensor 804 throughout the spaces of the building 802. The sensor node 906 can be associated with various timeseries, the timeseries can be a location timeseries 904 indicating the locations that the sensor 804 has been, PM2.5 timeseries 902 indicating PM2.5 measurements made by the air quality sensor 906, and VOC timeseries 908 indicating VOC measurements made by the air quality sensor 906. The sensor 906 can measure the events of the timeseries 902, 904, and 908 and store them in the graph 834. The sensor node 906 is related to the timeseries nodes 902, 904, and 908 via the "hasA" edges 950, 952, and 954.

The twin manager 108 can receive air quality data 830 for a specific mobile air quality sensor 804. The twin manager 108 can receive an identifier (e.g., a name, a product number, a serial number, etc.) of the mobile air quality sensor 804. The twin manager 108 can identify the node 906 representing the mobile air quality sensor 804 that the twin manager 108 has received the air quality data 830 for based on the identifier. For example, the node 906 may store the identifier and the twin manager 108 can identify the node 906 by comparing the received identifier and the identifier of the node 906 and determining that the identifiers match. The twin manager 108 can identify nodes for storing the air quality data 830 in by identifying nodes 902, 904, and 908 related to the node 906 via edges 952, 954, and 950. For example, the air quality data 830 can include a VOC timeseries and a PM2.5 series and the location data 832 can include a location timeseries. Responsive to identifying the edges 950, 952, and 954 relating the node 906 representing the mobile air quality sensor 804, the twin manager can store the VOC timeseries in the node 908 representing the VOC timeseries, store the PPM2.5 timeseries in the node 902 representing the PM2.5 timeseries, and store the location timeseries in the node 904 representing the location timeseries.

The employee node 910 is related to a building node 916 by a "worksA" edge 956 to indicate that the employee works at a specific building. The employee node 910 is related to a total exposure levels node 912 and a health alert node 914 via "hasA" edges 960 and 962. The analyzer 814 can determine that the employee is associated with the specific sensor 906 via the edge 958 and analyze the timeseries of nodes 902, 904, and/or 908 to determine a total exposure levels for the employee. The total exposure levels can be a virtual data point, a data rollup, a timeseries of values, a status indicator, etc. Examples of timeseries analysis is found in U.S. patent application Ser. No. 15/182,579 filed Jun. 14, 2016, the entirety of which is incorporated by reference herein. Furthermore the health alert 914 may indicate that the employee 910 needs medical attention, e.g., has been exposed to such a high level of VOC or particulate (based on the timeseries 902 and/or 908) that the employee should have a check-up and/or medical review.

For example, the individual health analyzer 818 can query the building graph for the timeseries stored or linked by the nodes 902, 908, and/or 904 responsive to identifying an edge 958 between the node 910 representing the employee and the node 906 representing the sensor 804, and the nodes 902, 904, and 908 being related to the node 906 representing the sensor 804 by the edges 952, 950, and 954. This can indicate that the employee represented by the node 910 is exposed to air quality conditions indicated by the timeseries of the nodes 902, 904, and 908. The individual health analyzer 818 can process the timeseries data and determine various health metrics. For example, the health metrics can indicate an overall health of the employee, an alert that the employee has been exposed to poor air quality, a total length of time exposed to poor air quality, or any other metric that can indicate the physical health of the employee. The individual health analyzer 818 can transmit the resulting metric to the twin manager 108. The twin manager 108 can store the metric into the building graph 834. For example, the twin manager 108 can identify the node 910 representing the employee that the individual health analyzer 818 generated the metric for. The twin manager 108 can identify a node 912 to store a total exposure level metric in by identifying the edge 960 between the node 910 representing the employee and the node 912 representing the total exposure level. The twin manager 108 can identify a node 914 to store a health alert in by identifying the edge 962 between the node 910 representing the employee and the node 914 representing the health alert.

The building node 916 is related to a space node 922 via an "includes" edge 968. The space node 922 is related to a safety levels node 918 indicating safety levels for the space via a "hasA" edge 966. The safety levels 918 can indicate that the space is unsafe, e.g., has a VOC or PM2.5 above a particular level and/or a daily average over a particular level, etc. The VOC source alert 920 can indicate that the space 922 has a particular source of VOCs, e.g., equipment, etc. The analyzer 814 can determine the VOC source alert 920 based on the VOC timeseries 908. The VOC source alert 920 can be related to the space node 922 via the "hasA" edge 964.

The space health analyzer 820 can process the air quality data 830 that corresponds to a particular space. The space health analyzer 820 can identify a portion of the air quality data 830 associated with the particular space based on the location data 832, e.g., the space health analyzer 820 can identify the portion of air quality data 830 recorded by the mobile air quality sensor 804 within the particular space. The space health analyzer 820 can generate metrics describing health levels associated with the particular space, e.g., health metrics indicating how healthy it is for occupants to be within the space, e.g., whether the space is safe for occupants to be within or dangerous. The space health analyzer 820 can query the building graph 834 for the portion of air quality data 830 corresponding to a particular space represented by the node 922, receive the portion of the air quality data 830 from the twin manager 108, and generate the metric based on the portion of the air quality data 830. The space health analyzer 820 can send the generated health metric for the space back to the twin manager 108 to be stored in the building graph 834. The twin manager 108 can identify the node 922 representing the space. The twin manager 108 can identify nodes related to the node 922 that store metrics for the space. For example, the twin manager 108 can identify an edge 966 between the node 922 and the node 918. Responsive to identifying the node 916 being related to the node 922 by the edge 966, the twin manager 108 can store safety levels (if the metric is a safety level) in the node 918 representing the safety level. Responsive to identifying the node 920 being related to the node 922 by the edge 964, the twin manager 108 can store a VOC source alert (if the metric is a VOC source alert) in the node 920 representing the VOC source alert.

The twin manager 108 can use the location data 832 to determine what nodes to store the air quality data 830, or information derived from the air quality data 830 by the air quality analyzer 814, in. For example, the twin manager 108 can compare the air quality data 830 against the location data 832 to indicate coordinates, rooms, or spaces that the air quality data 830 was measured, recorded, or sensed in. For example, the location data 832 and the air quality data 830 can be linked via timestamps or a single time stamp. The twin manager 108 can sort the air quality data 830 into various sets of air quality data 830, each set for a specific space. The twin manager 108 can identify the particular space associated with each set of the air quality data 830 and store the set of air quality data 830 or information derived from the air quality data 830 in the building graph 834 related to the particular space. For example, the twin manager 108 can identify the node 922 representing a space that the twin manager 108 has created a set of air quality data 830 for. The twin manager 108 can store the set of air quality data 830, or a link to the set of air quality data 830, in a node related to the node 922 by an edge. For example, the twin manager 108 can receive a derived safety level or VOC source alert based on the set of air quality data and store the safety level in the node 918 responsive to identifying the edge 966 between the node 922 and the node 918. In some embodiments, the twin manager 108 can store the set of air quality data in a node linked to the node 922 representing the space by an edge. The twin manager 108 can store the VOC source alert in the node 920 responsive to identify the edge 964 between the node 922 and the node 920.

Figure 10:
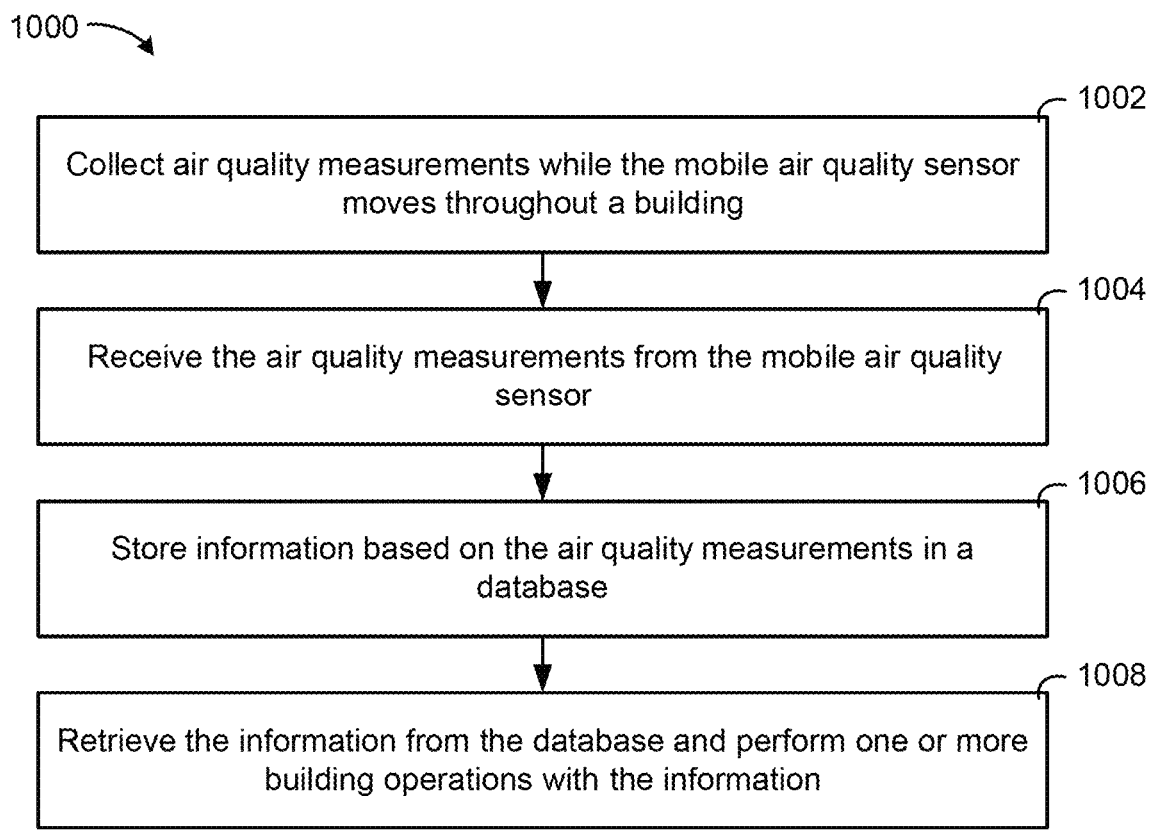
FIG. 10 is a flow diagram of a process of collecting air quality measurements from a mobile air quality sensor and storing information based on the air quality measurements in a digital twin, according to some embodiments.

Referring now to FIG. 10, a process 1000 of collecting air quality measurements from a mobile air quality sensor and storing information based on the air quality measurements in a digital twin is shown, according to some embodiments. The mobile air quality sensor 804 can perform at least one step of the process 1000. The wireless beacon 810 can perform at least one step of the process 1000. The user device 812 can perform at least one step of the process 1000. Furthermore, the twin manager 108, the cloud platform 106, and/or the edge platform 102 can perform at least one step of the process 1000. The air quality analyzer 814, or a component of the air quality analyzer 814, can perform at least one step of the process 1000. The process 1000 includes a step 1002 of collecting air quality measurements while the mobile air quality sensor moves throughout a building. The process 1000 includes a step 1004 of receiving the air quality measurements from the mobile air quality sensor. The process 1000 includes a step 1006 of storing information based on the air quality measurements in a database. The process 1000 includes a step 1008 of retrieving the information from the database and performing one or more building operations with the information.

In step 1002, the process 1000 can include collecting, by one or more processing circuits, air quality measurements while the mobile air quality sensor moves throughout a building. For example, one or more processing circuits of the mobile air quality sensors 804 can receive air quality measurements via the sensor 806. The mobile air quality sensors 804 can continuously or periodically measure at least one air quality condition while the mobile air quality sensor 804 moves throughout the building 802 (e.g., throughout areas, hallways, zones, floors, or spaces of the building 802). The mobile air quality sensor 804 can store the air quality data 830 resulting from the measurements on one or more memory or storage The mobile air quality sensor 804 can move through the building 802 by operating a tractive component or being carried by a user, occupant, or other person. While the mobile air quality sensor 804 moves through the building 802, the mobile air quality sensor 804 can generate, record, measure, or store, the location data 832 or the air quality data 830. The wireless beacons 810 or the user device 812 can receive information from the mobile air quality sensors 804 and generate the location data 832 or the air quality data 830.

In step 1004, the process 1000 can include receiving, by one or more processing circuits, air quality measurements from a mobile air quality sensor. For example, the edge platform 102 can receive the air quality data 830 from the wireless beacons 810, the user device 812, and/or the mobile air quality sensor 804. The edge platform 102 can receive the air quality data 830 via the network 104. Furthermore, the edge platform 102 can receive the location data 832 from the wireless beacons 810, the user device 812, and/or the mobile air quality sensor 804. The edge platform 102 can receive the location data 832 via the network 104. The edge platform 102 can communicate the location data 832 and/or the air quality data 830 to the cloud platform 106. The cloud platform 106 can communicate the location data 832 and/or the air quality data 830 to the twin manager 108. Furthermore, the edge platform 102, the cloud platform 106, and/or the twin manager 108 can communicate the location data 832 and/or the air quality data 830 to the air quality analyzer 814.

In step 1006, the process 1000 can include storing, by one or more processing circuits, information based on the air quality measurements in a database. For example, the twin manager 108 can store the air quality data 830 within a digital twin. The digital twin can be or include a building graph 834. The twin manager 108 can store information, or a link to the information, in the building graph 834. The information can be the air quality data 830 itself, timeseries data of the air quality data 830, health metrics derived from the air quality data 830, location data 832 associated with the air quality data 830, etc. For example, the twin manager 108 can store the air quality data 830 in the digital twin and the air quality analyzer 814 can query the digital twin for the information. The air quality analyzer 814 can generate information, metrics, values, inferences, predictions, alerts, alarms, or any other information based on the retrieved information. The twin manager 108 can receive the generated information from the air quality analyzer 814 and store the generated information.

For example, the twin manager 108 can store the information, or links to the information, in nodes of the building graph 834. The twin manager 108 can identify nodes to store the information in based on edges of the building graph 834 relating various nodes. For example, for a particular mobile air quality sensor 804, the twin manager 108 can identify a first node representing the mobile air quality sensor 804 and edges between the first node and other nodes representing storage locations for the measurements of the mobile air quality sensor 804. The twin manager 108 can store the information in the other nodes responsive to identifying edges between the first node and the other nodes. For example, the twin manager 108 can store a first timeseries of data for a first environmental condition measured by the mobile air quality sensor 804 in one of the other nodes and a second timeseries of data for a second environmental condition measured by the mobile air quality sensor 804 in another one of the other nodes.

In step 1008, the process 1000 can include retrieving, by one or more processing circuits, information from the database and perform one or more building operations with the information. For example, the air quality analyzer 814 can query the building graph 834 for information by sending a query data structure including query parameters to the twin manager 108. The twin manager 108 can execute the query based on the query parameters to identify information in the building graph 834 and return the information to the air quality analyzer 814. The twin manager 108 can query the building graph 834 to retrieve the location data 832 or the air quality data 830. The twin manager 108 can provide the location data 832 or the air quality data 830 to the air quality analyzer 814.

The air quality analyzer 814 can run various analytics or applications against the retrieved location data 832 or the retrieved air quality data 830. For example, the various components 816-828 can run against the retrieved location data 832 and/or the retrieved air quality data 830. For example, the building controller 828 can execute against the location data 832 and/or the air quality data 830. For example, the building controller 828 can execute against the location data 832 and/or the air quality data 830 to control the operation of the building subsystems 122. For example, the building controller 828 can be configured to perform at least one operation based on the contextual representation of the building graph 834, the location data 832, and/or the air quality data 830. For example, the building controller 828 can generate control settings, control parameters, or other data to cause a piece of building equipment to control the environmental conditions of at least one space of the building 802. For example, the building controller 828 can be configured to control an environmental condition of the building 802 to improve the air quality levels of the building 802.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed:

1. A building system of a building comprising one or more memory devices having instructions stored thereon, that, when executed by one or more processors, cause the one or more processors to:
   receive air quality measurements of a plurality of spaces of the building from a mobile air quality sensor comprising at least one tractive component to move the mobile air quality sensor throughout the plurality of spaces of the building, the mobile air quality sensor configured to:
      collect the air quality measurements of the plurality of spaces while the mobile air quality sensor moves throughout the plurality of spaces of the building, the air quality measurements comprising data identifying locations and times at which the air quality measurements were collected; and
      provide the air quality measurements to the one or more processors;
   store information, or a link to the information, in a database based on the air quality measurements;
   detect, based on the information, a condition occurring in a space of the plurality of spaces; and
   cause, responsive to detecting the condition occurring in the space, the mobile air quality sensor to move, using the at least one tractive component, to the space to perform subsequent air quality measurements.

2. The building system of claim 1, wherein the instructions cause the one or more processors to:
   control operation of a piece of building equipment to control an environmental condition of at least one space of the plurality of spaces based on the information of the database.

3. The building system of claim 1, wherein the instructions cause the one or more processors to:
   receive a plurality of locations of the mobile air quality sensor tracking the mobile air quality sensor throughout the plurality of spaces of the building;
   determine, a first set of air quality measurements of the air quality measurements taken by the mobile air quality sensor in a first space of the plurality of spaces, based on the plurality of locations;
   determine, a second set of air quality measurements of the air quality measurements taken by the mobile air quality sensor in a second space of the plurality of spaces, based on the plurality of locations;
   store, in the database, first information, or a link to the first information, for the first space based on the first set of air quality measurements; and
   store, in the database, second information, or a link to the second information, for the second space based on the first set of air quality measurements.

4. The building system of claim 1, comprising a second mobile air quality sensor, the second mobile air quality sensor comprising:
   a strap configured to be worn by an occupant that moves the second mobile air quality sensor throughout the plurality of spaces of the building.

5. The building system of claim 1, comprising a second mobile air quality sensor configured to be carried by an occupant throughout the plurality of spaces of the building, wherein the database is a digital twin comprising a building graph, the building graph comprising:
   a plurality of nodes representing entities of the building and a plurality of edges between the plurality of nodes representing relationships between the entities of the building;
   wherein a first node of the plurality of nodes represents the second mobile air quality sensor;
   wherein a second node of the plurality of nodes represents the occupant that carries the second mobile air quality sensor throughout the plurality of spaces of the building;
   wherein an edge of the plurality of edges between the first node and the second node indicates that the occupant carries the second mobile air quality sensor throughout the plurality of spaces of the building.

6. The building system of claim 1, comprising a second mobile air quality sensor configured to be carried by an occupant throughout the plurality of spaces of the building, wherein the database is a digital twin comprising a building graph, the building graph comprising:
   a plurality of nodes representing entities of the building and a plurality of edges between the plurality of nodes representing relationships between the entities of the building;
   wherein a first node of the plurality of nodes represents the second mobile air quality sensor;
   wherein a second node of the plurality of nodes represents the occupant that carries the second mobile air quality sensor throughout the plurality of spaces of the building;
   wherein an edge of the plurality of edges between the first node and the second node indicates that the occupant carries the second mobile air quality sensor throughout the plurality of spaces of the building; and
   wherein the instructions cause the one or more processors to:
      generate a health metric indicating a health level of the occupant based on air quality measurements of the second mobile air quality sensor;
      identify a third node of the plurality of nodes related to the second node based on a second edge of the plurality of edges between the third node and the second node; and
      store the health metric, or a link to the health metric, in the third node responsive to identifying the third node.

7. The building system of claim 1, wherein the database is a building graph, wherein the instructions cause the one or more processors to:
   generate a metric describing air quality for the space of the plurality of spaces based on the air quality measurements;
   identify a first node of a plurality of nodes of the building graph linked to a second node of the plurality of nodes representing the space based on an edge of a plurality of edges between the plurality of nodes relating the first node to the second node; and
   store the metric, or a link to the metric, in the first node responsive to an identification of the first node.

8. The building system of claim 1, wherein the instructions cause the one or more processors to:
receive a timeseries of the air quality measurements from the mobile air quality sensor; and
store the timeseries, or a link to the timeseries, in the database, the database comprising a representation of the mobile air quality sensor and a relationship between the representation of the mobile air quality sensor and the timeseries or the link to the timeseries.

9. The building system of claim 1, wherein the database is a building graph, wherein the instructions cause the one or more processors to:
receive a first timeseries of measurements of a first air quality condition from the mobile air quality sensor;
receive a second timeseries of measurements of a second air quality condition from the mobile air quality sensor;
identify a first node of a plurality of nodes of the building graph representing the mobile air quality sensor;
identify a second node of the plurality of nodes of the building graph representing the first air quality condition based on a first edge of a plurality of edges of the building graph relating the first node to the second node;
store information based on the first timeseries, or a link to the information, in the second node responsive to an identification of the second node;
identify a third node of the plurality of nodes of the building graph representing the second air quality condition based on a second edge of the plurality of edges of the building graph relating the first node to the third node; and
store information based on the second timeseries, or a link to the information, in the third node responsive to an identification of the third node.

10. The building system of claim 1, wherein the air quality measurements are measurements of at least one of:
a particulate level;
a level of volatile organic compounds;
a carbon monoxide level;
a carbon dioxide level; and
a nitrogen dioxide level.

11. A method, comprising:
collecting, by a mobile air quality sensor comprising at least one tractive component to move the mobile air quality sensor throughout a plurality of spaces of a building, air quality measurements of the plurality of spaces of the building while the mobile air quality sensor moves throughout the plurality of spaces of the building, the air quality measurements comprising data identifying locations and times at which the air quality measurements were collected;
providing, by the mobile air quality sensor, the air quality measurements to one or more processing circuits;
receiving, by the one or more processing circuits, the air quality measurements of the plurality of spaces of the building from the mobile air quality sensor;
storing, by the one or more processing circuits, information, or a link to the information, in a database based on the air quality measurements;
detecting, by the one or more processing circuits, based on the information, a condition occurring in a space of the plurality of spaces; and
causing, by the one or more processing circuits, responsive to detecting the condition occurring in the space, the mobile air quality sensor to move, using the at least one tractive component, to the space to perform subsequent air quality measurements.

12. The method of claim 11, comprising:
controlling, by the one or more processing circuits, operation of a piece of building equipment to control an environmental condition of at least one space of the plurality of spaces based on the information of the database.

13. The method of claim 11, comprising:
receiving, by the one or more processing circuits, a plurality of locations of the mobile air quality sensor tracking the mobile air quality sensor throughout the plurality of spaces of the building;
determining, by the one or more processing circuits, a first set of air quality measurements of the air quality measurements taken by the mobile air quality sensor in a first space of the plurality of spaces, based on the plurality of locations;
determining, by the one or more processing circuits, a second set of air quality measurements of the air quality measurements taken by the mobile air quality sensor in a second space of the plurality of spaces, based on the plurality of locations;
storing, by the one or more processing circuits, in the database, first information, or a link to the first information, for the first space based on the first set of air quality measurements; and
storing, by the one or more processing circuits, in the database, second information, or a link to the second information, for the second space based on the first set of air quality measurements.

14. The method of claim 11, comprising a second mobile air quality sensor configured to be carried by an occupant throughout the plurality of spaces of the building, wherein the database is a digital twin comprising a building graph, the building graph comprising:
a plurality of nodes representing entities of the building and a plurality of edges between the plurality of nodes representing relationships between the entities of the building;
wherein a first node of the plurality of nodes represents the second mobile air quality sensor;
wherein a second node of the plurality of nodes represents the occupant that carries the second mobile air quality sensor throughout the plurality of spaces of the building;
wherein an edge of the plurality of edges between the first node and the second node indicates that the occupant carries the second mobile air quality sensor throughout the plurality of spaces of the building.

15. The method of claim 11, comprising a second mobile air quality sensor configured to be carried by an occupant throughout the plurality of spaces of the building, wherein the database is a digital twin comprising a building graph, the building graph comprising:
a plurality of nodes representing entities of the building and a plurality of edges between the plurality of nodes representing relationships between the entities of the building;
wherein a first node of the plurality of nodes represents the second mobile air quality sensor;
wherein a second node of the plurality of nodes represents the occupant that carries the second mobile air quality sensor throughout the plurality of spaces of the building;
wherein an edge of the plurality of edges between the first node and the second node indicates that the occupant carries the second mobile air quality sensor throughout the plurality of spaces of the building; and wherein the method includes:

generating, by the one or more processing circuits, a health metric indicating a health level of the occupant based on air quality measurements of the second mobile air quality sensor;

identifying, by the one or more processing circuits, a third node of the plurality of nodes related to the second node based on a second edge of the plurality of edges between the third node and the second node; and storing, by the one or more processing circuits, the health metric, or a link to the health metric, in the third node responsive to identifying the third node.

16. The method of claim 11, wherein the database is a building graph, the method comprising:

generating, by the one or more processing circuits, a metric describing air quality for the space of the plurality of spaces based on the air quality measurements;

identifying, by the one or more processing circuits, a first node of a plurality of nodes of the building graph linked to a second node of the plurality of nodes representing the space based on an edge of a plurality of edges between the plurality of nodes relating the first node to the second node; and storing, by the one or more processing circuits, the metric, or a link to the metric, in the first node responsive to an identification of the first node.

17. The method of claim 11, comprising:

receiving, by the one or more processing circuits, a timeseries of the air quality measurements from the mobile air quality sensor; and storing, by the one or more processing circuits, the timeseries, or a link to the timeseries, in the database, the database comprising a representation of the mobile air quality sensor and a relationship between the representation of the mobile air quality sensor and the timeseries or the link to the timeseries.

18. The method of claim 11, wherein the database is a building graph, the method comprising:

receiving, by the one or more processing circuits, a first timeseries of measurements of a first air quality condition from the mobile air quality sensor;

receiving, by the one or more processing circuits, a second timeseries of measurements of a second air quality condition from the mobile air quality sensor;

identifying, by the one or more processing circuits, a first node of a plurality of nodes of the building graph representing the mobile air quality sensor;

identifying, by the one or more processing circuits, a second node of the plurality of nodes of the building graph of the database representing the first air quality condition based on a first edge of a plurality of edges of the building graph relating the first node to the second node;

storing, by the one or more processing circuits, information based on the first timeseries, or a link to the information, in the second node responsive to an identification of the second node;

identifying, by the one or more processing circuits, a third node of the plurality of nodes of the building graph representing the second air quality condition based on a second edge of the plurality of edges of the building graph relating the first node to the third node; and storing, by the one or more processing circuits, information based on the second timeseries, or a link to the information, in the third node responsive to an identification of the third node.

19. A building system of a building comprising:

a mobile air quality sensor comprising at least one tractive component to move the mobile air quality sensor throughout a plurality of spaces of the building, the mobile air quality sensor configured to:

collect air quality measurements of the plurality of spaces while the mobile air quality sensor moves throughout the plurality of spaces of the building, the air quality measurements comprising data identifying locations and times at which the air quality measurements were collected; and provide the air quality measurements to one or more processing circuits;

the one or more processing circuits configured to:

receive the air quality measurements of the plurality of spaces of the building from the mobile air quality sensor;

store information, or a link to the information, in a database based on the air quality measurements;

detect, based on the information, a condition occurring in a space of the plurality of spaces; and cause, responsive to detecting the condition occurring in the space, the mobile air quality sensor to move, using the at least one tractive component, to the space to perform subsequent air quality measurements.

20. The building system of claim 19, wherein the one or more processing circuits are configured to:

control operation of a piece of building equipment to control an environmental condition of at least one space of the plurality of spaces based on the information of the database.

* * * * *